United States Patent [19]
Grethlein et al.

[11] Patent Number: 5,124,004
[45] Date of Patent: * Jun. 23, 1992

[54] DISTILLATION PROCESS FOR ETHANOL

[75] Inventors: Hans E. Grethlein, Okemos, Mich.; Lee R. Lynd, Meriden, N.H.

[73] Assignee: Trustees of Dartmouth College, Hanover, N.H.

[*] Notice: The portion of the term of this patent subsequent to Oct. 9, 2007 has been disclaimed.

[21] Appl. No.: 475,732

[22] Filed: Feb. 6, 1990

Related U.S. Application Data

[60] Continuation-in-part of Ser. No. 897,986, Aug. 19, 1986, Pat. No. 4,961,826, which is a division of Ser. No. 829,549, Feb. 13, 1986, Pat. No. 4,626,321, which is a continuation of Ser. No. 525,102, Aug. 22, 1983, abandoned.

[51] Int. Cl.$^5$ ............................ B01D 3/40; C12P 7/06
[52] U.S. Cl. ......................................... 203/19; 203/26; 203/27; 203/33; 203/50; 203/82; 203/83; 203/DIG. 4; 203/DIG. 13; 203/DIG. 19; 203/DIG. 25; 202/154; 435/161; 568/916
[58] Field of Search .................... 203/26, 98, 24, 27, 203/19, DIG. 13, DIG. 19, DIG. 25, 99, 29, 33, DIG. 4, 94, 82, 74, 81, 53, 50, 83, 76, 25; 202/154, 153, 158, 155; 62/30, 26, 34; 568/916; 435/161

[56] References Cited

U.S. PATENT DOCUMENTS

| | | | |
|---|---|---|---|
| 1,879,847 | 9/1932 | Gorhan | 203/19 |
| 3,338,799 | 8/1967 | Brandt et al. | 202/155 |
| 3,558,438 | 1/1971 | Schoenbeck | 203/26 |

(List continued on next page.)

OTHER PUBLICATIONS

Torres et al., "Computer Simulation of the Dartmouth Process for Separation of Dilute Ethanol/Water Mixtures", *J. Appl. BioChem. and BioTech.*, 20/21:621 (1989).

Lynde et al., "IHOSR/Extractive Distillation for Ethanol Separation", *Chem. Eng. Progress*, pp. 59-62 (Nov. 1984).

Primary Examiner—Wilbur Bascomb, Jr.
Attorney, Agent, or Firm—Hamilton, Brook, Smith and Reynolds

[57] ABSTRACT

A method of distillation employing a heat pump (which may be driven by a compressor) using a vapor stream from within the distillation system as a heat source and a liquid stream from within the distillation system as a heat sink. The selection of heat-source vapors and heat-sink liquid is such that at least one is withdrawn from the phase-contracting region of the distillation system. The return of streams withdrawn from the phase-contacting region of the distillation system to the distillation system is such that at least one of the streams is returned at a temperature different from that of the point from which it was withdrawn, and all withdrawn streams are returned in manner such that a stream removed as vapor is returned at a point with a temperature at most that at the point it was withdrawn, and a stream removed as liquid is returned at a point with a temperature at least that at which it was withdrawn. Embodiments of the basic method where vapor only, liquid only, or both liquid and vapor are withdrawn from and returned to the phase-contacting region of the distillation system are considered. The impact of the invention is to reduce the heat requirement of distillation in exchange for an amount of work which is usually small because the temperature difference between heat sources and sinks is minimized. Combination of the basic distillation method with multi-effect distillation, convention overhead-to-reboiler heat pumped distillation, azeotropic and extractive distillation, and fermentative production of volatile compounds is described. A system specifically designed for the separation of ethanol-water mixtures which utilizes the present invention and extractive distillation in a system with extensive heat integration is presented.

10 Claims, 25 Drawing Sheets

U.S. PATENT DOCUMENTS

| | | | |
|---|---|---|---|
| 3,692,636 | 9/1972 | Huguet | 203/71 |
| 4,023,946 | 5/1977 | Schwartzman | 62/40 |
| 4,025,398 | 5/1977 | Haselden | 203/25 |
| 4,031,153 | 6/1977 | Haskell | 203/60 |
| 4,177,137 | 12/1979 | Kruse | 203/26 |
| 4,230,535 | 10/1980 | Howard | 203/26 |
| 4,234,391 | 11/1980 | Seader | 203/26 |
| 4,303,478 | 12/1981 | Field | 203/19 |
| 4,306,942 | 12/1981 | Brush et al. | 203/DIG. 13 |
| 4,308,106 | 12/1981 | Mannfeld | 203/19 |
| 4,308,107 | 12/1981 | Markfort | 203/23 |
| 4,309,254 | 1/1982 | Dahlstrom et al. | 203/25 |
| 4,349,416 | 9/1982 | Brandt et al. | 203/98 |
| 4,362,601 | 12/1982 | Morita | 203/DIG. 13 |
| 4,395,310 | 7/1982 | Idenden | 203/2 |
| 4,395,533 | 11/1983 | Wilke et al. | 435/161 |
| 4,440,601 | 4/1984 | Katz et al. | 203/24 |
| 4,444,576 | 4/1984 | Ryan et al. | 203/26 |
| 4,575,405 | 3/1986 | Sterlini | 203/26 |
| 4,586,986 | 5/1986 | Preusser et al. | 203/27 |
| 4,626,321 | 12/1986 | Grethlein et al. | 203/98 |
| 4,961,826 | 10/1990 | Grethlein et al. | 203/19 | ers,

DISTILLATION PROCESS FOR ETHANOL

RELATED APPLICATION

This is a continuation-in-part of Ser. No. 06/897,986, filed Aug. 19, 1986 now U.S. Pat. No. 4,961,826, which is a divisional of Ser. No. 06/829,549, filed Feb. 13, 1986, now U.S. Pat. No. 4,626,321, which was a continuation of Ser. No. 06/525,102, filed Aug. 22, 1983, now abandoned.

The present invention relates to distillation systems and to methods of operation of the systems.

Attention is called to U.S. Pat. Nos. 4,234,391 (Seader); 4,308,107 (Markfort); 3,558,438 (Schoenbeck); 4,025,398 (Haselden); 4,303,478 (Field); 4,359,533 (Wilke); and 4,308,106 (Mannsfield), as well as to chapter 7, ELEMENTS OF DISTILLATION, Robinson and Gilliland (McGraw Hill); chapter 5, SEPARATION PROCESSES, King (McGraw Hill); DISTILLATION, PRINCIPLES AND DESIGN PROCEDURES, Hengstebeck (Robert E. Krieger). See also, technical articles: "Distillation With Secondary Reflux and Vaporization: A Comparative Evaluation," Mah et al.; "Extractive Distillation Employing a Dissolved Salt as Separating Agent," Cook and Furter; "Vapor Re-Use Process," Othmer; "Energy Requirements in the Separation by Mixtures By Distillation," Flower et al., "Distillation Columns With Vapor Recompression," Danzinger; "Heat Pumps in Distillation," Null; "The Heat Pump in Multicomponent Distillation," Freshwater; "Process and Design for Energy Conservation," Null et al.; "Novel Separation Technology May Supplant Distillation Towers," O'Sullivan; "Two Component Equilibrium Curves For Multicomponent Fractionation," Jenny and Cicalese. Also: "Microcalorimetry: A Tool For the Study of the Biodegradability of Straw by Mixed Bacterial Cultures," Fardeau et al.; and "Rapid Ethanol Fermentation of Cellulose Hydrolysate. II. Product and Substrate Inhibition and Optimization of Fermentor Design," Ghose and Tyagi; "Recovering Chemical Products From Dilute Fermentation Broths," Busche.

Distillation is a technique for separating mixtures based on differing component volatilities. One of the most commonly used methods of separation, distillation is widely used in the petroleum, chemical, and natural gas liquids industries. The energy requirement of distillation is significant by any measure, accounting for three percent of the total U.S. energy consumption by one estimate. Thus, a meaningful reduction in the energy required for separation of mixtures by distillation would have a favorable impact on energy consumption and economics in an industrialized country. In addition, a more efficient method of distillation may be expected to make feasible processes for which separation costs are now prohibitive.

The innovative techniques described herein involve moving heat within a distillation system between internal liquid and vapor streams using a heat pump, and returning removed mass streams having undergone a phase change in an optimal way. When internal streams are manipulated in this way both material streams and latent heat may be used more than once in a particular section of the distillation system. In addition, the ratio of internal liquid and vapor flows, or internal-reflux ratio (i.e., L/V herein), can be varied almost at will, often with a small investment of work due to small temperature differences between heat sources and sinks, thus circumventing the "pinch regions" which affect the energy and stage requirements of most distillation systems. The inventors refer to the applications of this inventive concept collectively as distillation with intermediate heat pumps and optimum sidestream return or IHOSR distillation.

As will be discussed, IHOSR distillation appears to have special benefits when applied to dilute solutions. Since fermentation products are typically dilute, and since fermentation is frequently a practical way to convert an available substrate into a desired product, albeit at low concentration, application of IHOSR enhanced distillation to recovery of dilute products from fermentation broths appears attractive in that it may be expected to make fermentative production of volatile materials more economically feasible. This is especially so because integration of certain material and energy flows in fermentation and distillation can result in beneficial results for both processes. Specifically, the productivity of the fermentation can be increased due to alleviation of end-product inhibition and/or increasing the residence time of cells and substrate relative to that based on the feed, and the energy requirements for the distillation may be lowered by making use of the metabolic heat released during fermentation.

In many cases, IHOSR distillation accomplishes more energy-efficient distillation given the constraints of the vapor-liquid equilibrium relationship for a particular mixture than does normal adiabatic distillation. Under some conditions, such as azeotrope-forming mixtures or mixtures with a low volatility ratio in a particular concentration range, there is strong incentive to change the vapor-liquid equilibrium relationship. This incentive is especially strong given the flexibility conferred by the IHOSR technique with respect to the internal reflux ratio. Changing the vapor-liquid equilibrium relationship can be achieved by changing the pressure or by adding additional component(s) to the mixture to achieve an extractive or azeotropic distillation. Combination of techniques which alter phase equilibrium with IHOSR distillation may be done either in a single distillation system or in several systems.

Recovery of ethanol generated by fermentation presents several of the problems and opportunities discussed above: a separation involving dilute solutions, fermentative production with product inhibition, and a mixture which forms an azeotrope and has a low relative volatility ratio in a given concentration range. Ethanol production and recovery thus constitute an attractive potential application of the IHOSR techniques and combination of the IHOSR techniques with fermentation and altered phase-equilibrium distillation techniques; this process will frequently be used in the examples discussed below.

It is the object of the present invention to provide:

most generally, (1) process and apparatus concepts which reduce the energy required for the separation of mixtures by distillation;

more specifically, (2) applications of the process and apparatus concepts referred to wherein the vapor-liquid equilibrium relationship is altered to achieve more energy-efficient separation and/or to achieve compositions not otherwise possible in a single distillation system due to the formation of azeotropes;

(3) applications of the process and apparatus concepts referred to wherein fermentative production of materials and recovery of the materials is integrated achieving some or all of the benefits above; and most specifically, (4) the particular application of the process and apparatus concepts descriped in (1) and the applications of those concepts as described in (2) and/or (3) to production by fermentation and recovery of ethanol.

The foregoing objects are achieved, generally, in a distillation system that includes a heat pump using a vapor stream from within the distillation system as the heat source and a liquid stream from within the distillation system as the heat sink, wherein at least one of the vapor stream and the liquid stream is withdrawn from the phase-contacting region of the system at a temperature intermediate between the highest and the lowest temperature in the system, and wherein at least one of the vapor stream and the liquid stream withdrawn from the phase-contacting region of the distillation system is returned to the distillation system at a point with a temperature different from that at which it was withdrawn, and wherein all withdrawn streams are returned to the distillation system at a point such that material removed in the liquid phase is returned at a point in the system with a temperature at least that at the point of liquid withdrawal and material removed in the vapor phase is returned at a point in the system with a temperature at most that at the point of vapor withdrawal. Heat sources and sinks may often be selected with small temperature difference between them, thus allowing heat to be pumped with high efficiency. In addition, the return of streams to the correct point in the column can allow significant reductions in the heat which must be supplied to the distillation system.

The invention is hereinafter described with reference to the accompanying drawings in which:

FIGS. 1A, 2A, 3A, and 4A show apparatus to provide distillation with intermediate heat pumps and optimum sidestream return (IHOSR);

FIGS. 1B, 1C, 2B, 3B, 3C, 4B, 4C, 5B, and 5C show graphically the influence of IHOSR distillation using the McCabeTheile method of analysis, FIGS. 1B and 1C corresponding with the apparatus in FIG. 1A, FIG. 2B corresponding with the apparatus of FIG. 2A, FIGS. 3B and 3C corresponding with the apparatus of FIG. 3A, FIGS. 4B and 4C corresponding with the apparatus of FIG. 4A, FIG. 5B, and FIG. 5C corresponding with the apparatus of FIG. 5A.

FIG. 5A shows apparatus that includes an IHOSR distillation system in series with a system adapted to permit addition of an extractive agent in an original configuration with extensive heat integration;

FIGS. 6A, 6B, 7, 8A, and 8B show apparatus to combine IHOSR distillation with fermentative production of volatile compounds;

Figure 1A:
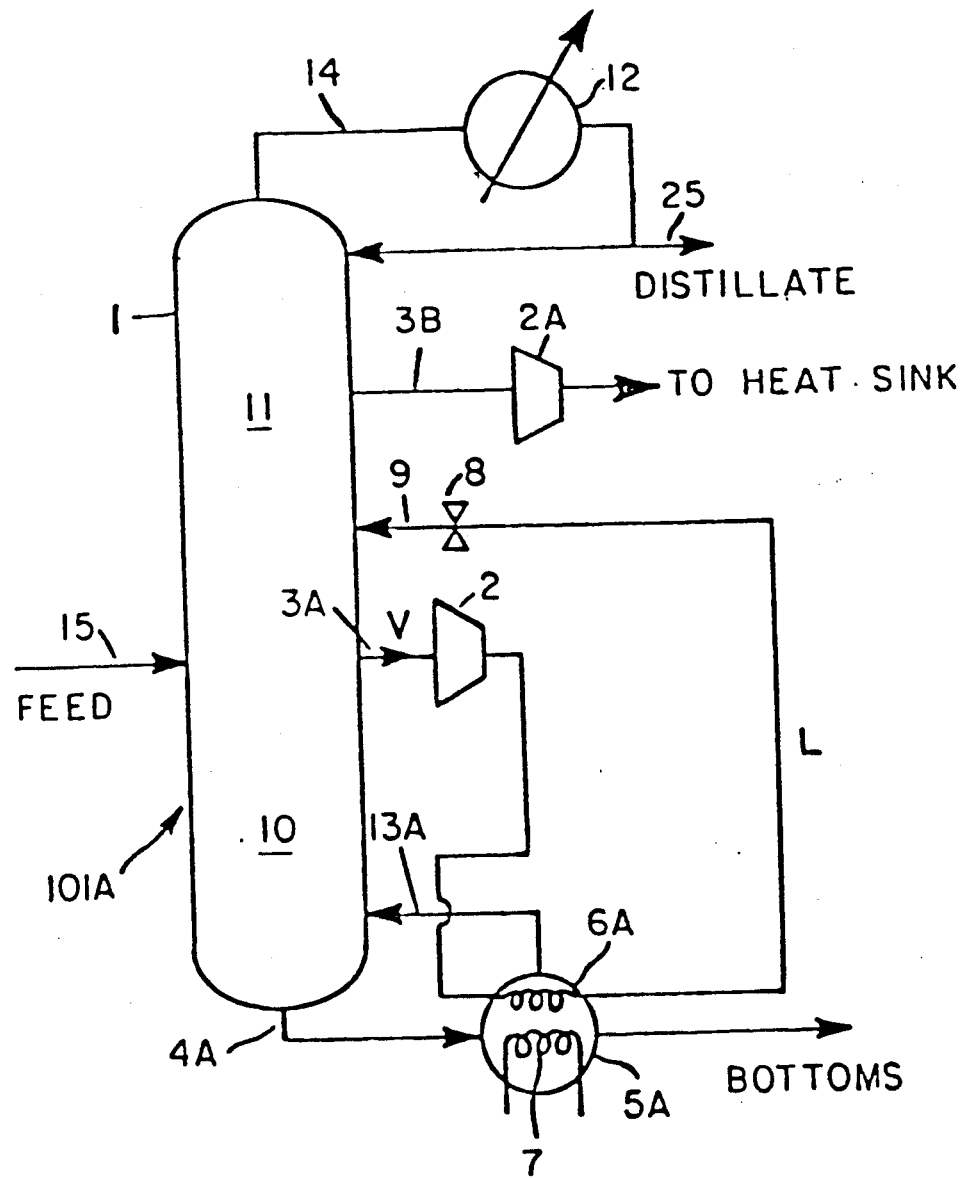

In order to place the explanation hereinafter in context, there now follows a preliminary discussion of the invention mostly with reference to FIGS. 1A, 1B, and 1C for illustrative purposes. A review of the figures will reveal a certain repetition of mechanisms. In order to simplify the explanations of the various mechanisms, the same or similar designations are applied to mechanisms that perform the same or similar function. Thus, for example, the label 101A in FIG. 1A designates distillation apparatus of the present invention employing one or more compressors 2, 2A ... ; in FIG. 2A the distillation apparatus is labeled 101B and the compressor is again labeled 2. In these explanations, emphasis is placed on a binary mixture introduced as a feed stock at 15; but the concepts are useful for distilling multi-component mixtures as well. Workers in this art will recognize FIGS. 1B and 1C to be McCabe-Theile diagrams in which the curve designated 30 is the equilibrium curve and the line designated 31 is the equality line; the feature labeled 32A is a sequence of line segments called the operating line; the ordinate (Y) in each graph represents the mole fraction of the more volatile component, hereafter referred to as "mole fraction," in the vapor and the abscissa (X) represents the mole fraction of the more volatile component in the liquid; $X_f$ represents the mole fraction of the more volatile component in the input feed in FIG. 1B, 1C and later figures. The present invention is directed to reducing the reboiler heat requirement by manipulating internal reflux ratios, which are the slopes of the segments of the operating line, e.g., the slope of the operating line 32A between points 33A and 33B in FIG. 1B or the slopes of the operating line 32B in FIG. 1C, between points 34A and 34B and/or between points 34B and 34C.

The distillation apparatus 101A employs intermediate heat pump with optimum sidestream return (IHOSR), a concept which is addressed above and later in some detail. Briefly, IHOSR distillation employs one or more heat pumps (which may be driven by compressors) using a vapor stream V in FIG. 1A withdrawn at 3A from within the distillation system (i.e., from among the distillation column marked 1 the reboiler marked 5A, and the condensor marked 12) as a heat source and a liquid stream withdrawn either from the column at 4A or elsewhere from within the distillation system as a heat sink, the heat-source vapor and the heat-sink liquid being selected so that the heat-sink liquid would have a higher temperature than liquid in equilibrium with the heat-source vapor if both liquids were at the same pressure, with heat exchange resulting in reciprocal phase change where condensation of the heat-source vapor V is accompanied by evaporation of the heat-sink liquid. To explain the concept of the previous sentence in the context of FIG. 1A, the heat pump includes the compressor 2 and the reboiler 5A that has internal heat-exchange coils 6A and 7. The coil 7, as is conventional, receives heat, usually via steam, from an outside source (not shown) to boil the liquid in the reboiler 5A. In the system shown in FIG. 1A, however, the steam heat input to the reboiler 5A is augmented by energy extracted from the vapor V which is compressed at 2 (to increase its temperature) and then condensed at 6A to extract energy therefrom and effect a phase change to a liquid L which is returned to the column 1 at 9 through a pressure reducing valve 8. Liquid in the reboiler 5A is vaporized and introduced at 13A to the bottom of the column 1. For the generalized IHOSR system, at least one of the vapor stream V and the liquid stream (at 4A in the illustrative example shown in FIG. 1A) is withdrawn from within the phase-contacting region (i.e., either from the stripping region shown at 10 or the rectifying region shown at 11 in FIG. 1A; the column 1 may be a plate column or a packed column or some other structure) of the distillation apparatus 101A and has a temperature intermediate between the highest temperature (i.e., the temperature of the reboiler 5A) and the lowest temperatures (i.e., the temperature of the condenser marked 12). At least one of the streams withdrawn from the phase-contacting region of the distillation system is returned to the distillation system at a point such that a stream removed as a liquid is returned at a point in the system with a temperature at least that at the point of liquid withdrawal, and a stream removed as a vapor is returned at a point in the system with a temperature at most that at the point of vapor withdrawal. And all withdrawn streams are returned to the distillation system at a point such that a stream removed as a liquid is returned at a point in the system with a temperature at least that at the point of liquid withdrawal and a stream removed as a vapor is returned at a point in the system with a temperature at most that at the temperature of vapor withdrawal. (In a conventional system, temperature decreases with height in the column.) This general description may be shown to apply to the specific case of FIG. 1A as follows. The vapor is withdrawn at 3A in FIG. 1A from the phase-contacting region at a temperature intermediate between the temperature in the condenser 12A, and in the reboiler 5A; the vapor is condensed as it donates heat to the reboiler liquid, the heat sink for this case, and the stream withdrawn as vapor is returned at a point in the phase-contacting system 9 with a lower temperature than the point at which it was withdrawn. In FIG. 1A, the heat-sink liquid was never withdrawn from the system, however other embodiments of the IHOSR technique involve removal of both vapor and liquid, or liquid only, accounting for the use of the expression "at least" in reference to withdrawn streams in the general description.

The preferred point in the distillation system to return a sidestream, or to introduce any feed for that matter, is the point at which the compositions of the vapor in the returned stream, if any vapor is present in the returned stream, is as close as possible to the composition of the vapor within the system at the return point, and the composition of the liquid in the return stream, if any liquid is present in the return stream, is as close as possible to the composition of the liquid within the system at the return point. Sidestream return in this manner minimizes the number of stages required for separation. It may be noted that flow rate of a returned stream relative to the flow rate of the distillate leaving the system has an influence on internal reflux ratios, and so the compositions of liquid and vapor passing each other is at a given point, in the phase-contacting device. The maximum practical flow through a given sidestream is determined by the condition where the sidestream is returned at the preferred point as described above, and where the compositions of passing liquid and vapor streams within the distillation system in the immediate vicinity of the return point are as close as practically possible to being in equilibrium given the constraint of a reasonable number of stages in nearly pinched regions occurring either in the region of stream return or elsewhere.

Figure 1B:
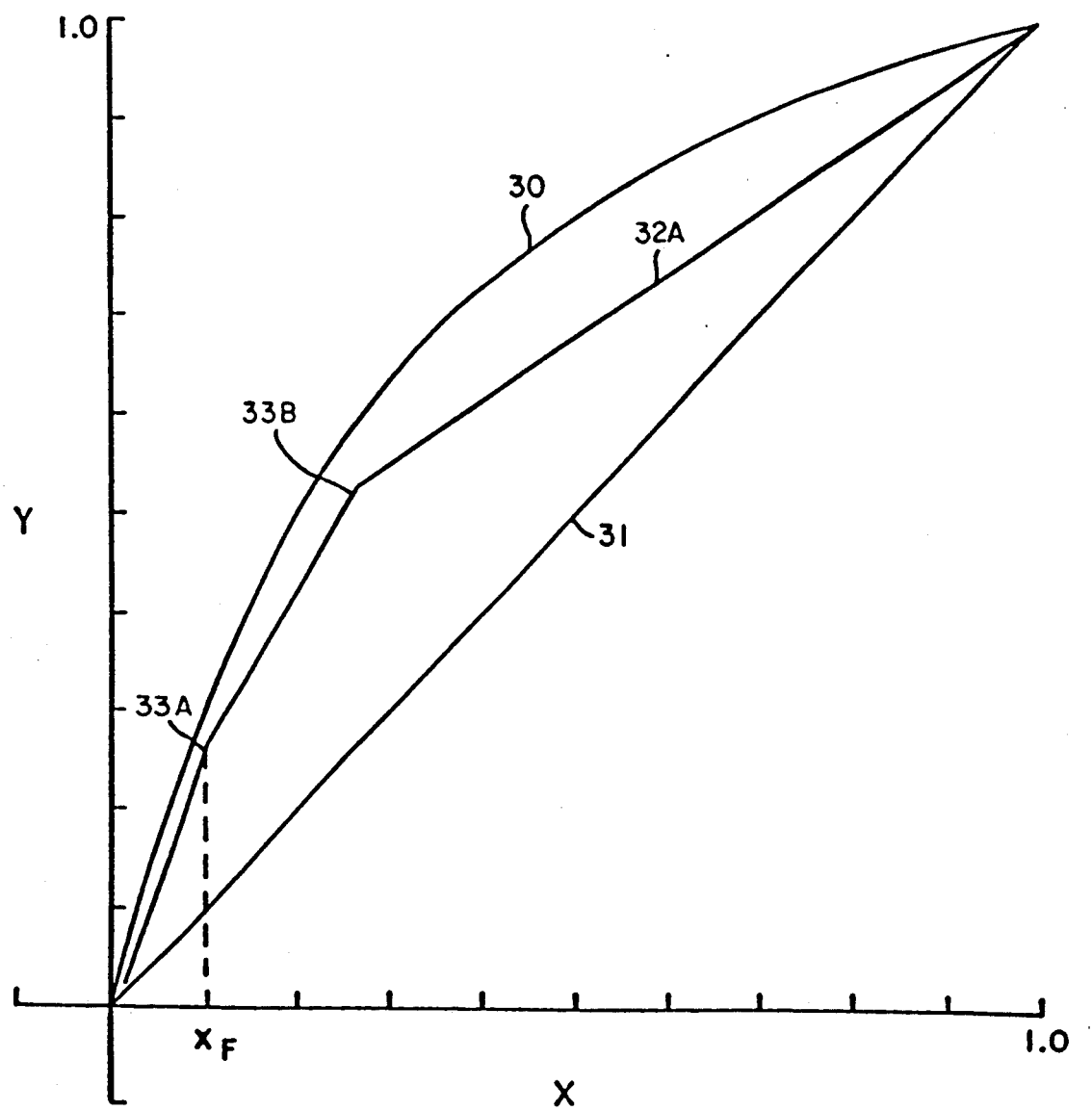
Figure 1C:
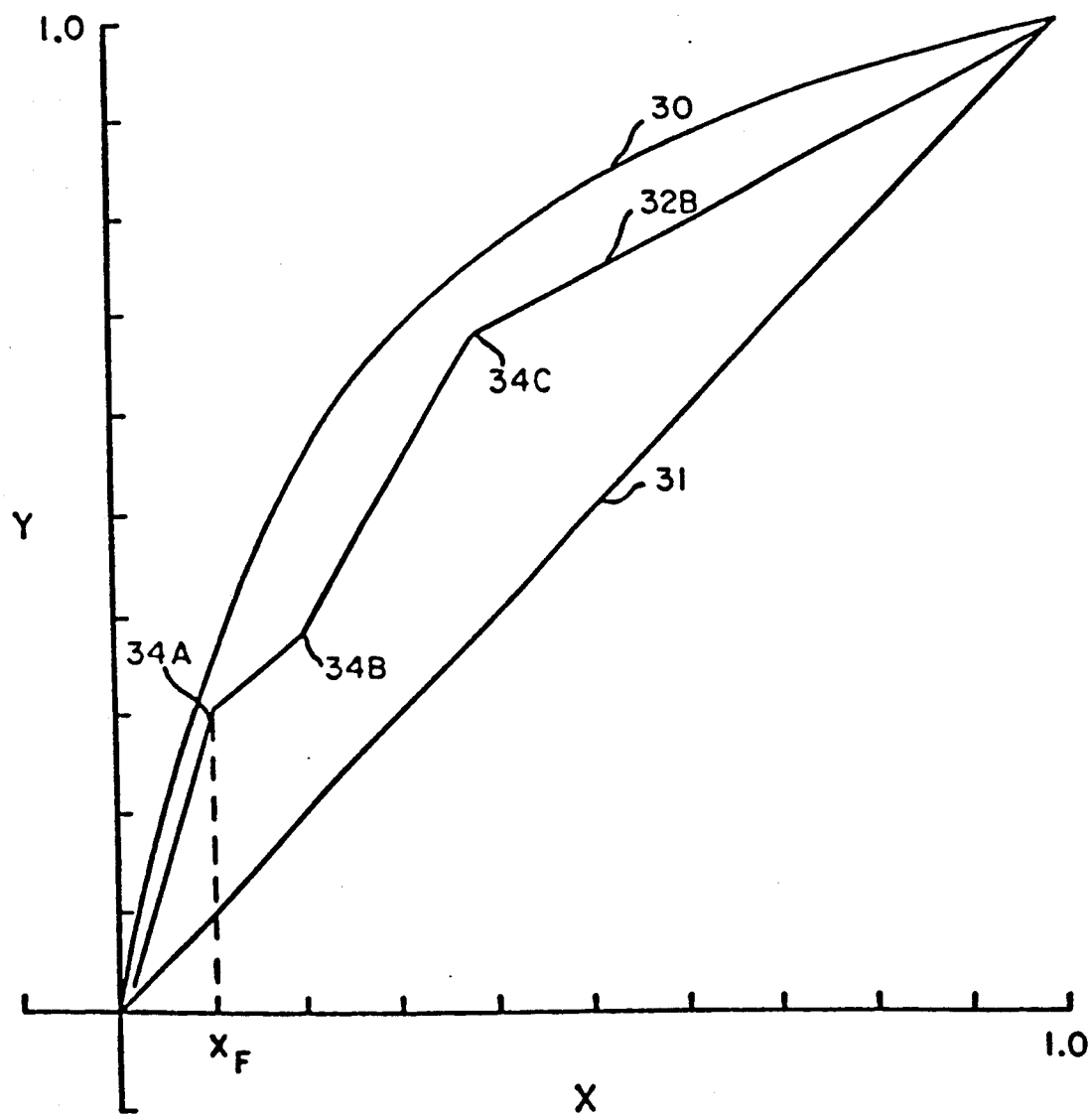

In the context of FIG. 1A the flow rate of the removed stream (e.g., the vapor stream V removed at 3A) relative to the flow rate of the distillate leaving the system at 25 (or the flow rate of the vapor in the phase-contacting portion) must be such that the desirable compositions within the system (between withdrawal at 3A and reintroduction at 9), specified above, are achieved; said another way, the volume of vapor withdrawn at 3A and returned (as a condensate) at 9 must be enough to effect meaningful changes in the slope of the operating line between 3A and 9 in the column 1A (see, for example, the slope of the operating line segment between points 33A and 33B in FIG. 1B). Some more general considerations are now given.

A distillation system consists of mechanisms to facilitate mass transfer between opposite phases moving in a counter-current fashion, a mechanism to provide a vapor rich in the more volatile component(s) and a mechanism to provide a liquid rich in the less volatile component(s). Ordinarily, these functions are provided by a column, a reboiler, and a condenser/stream splitter, respectively. However, quite different arrangements have also been proposed, for example, by Markfort, Schoenbeck and O'Sullivan. The generic term "distillation system" is used herein to refer to a collection of phase-contacting device(s), device(s) for providing or introducing vapor, and device(s) for providing or introducing liquid which accomplish the same end as a conventional system composed of a column, a reboiler, and a condenser/stream splitter. In the following discussion and subsequent claims, heat exchange is considered to occur within the distillation system when it takes place within the phase-contacting device, for example, the column 1 in FIG. 1A and later figures, the terminal condenser 12 (at the lowest temperature in the system), the terminal reboiler 5A in FIG. 1A, 5B in FIG. 2A, etc. (at the highest temperature in the system), or their equivalents in an unconventional system. Heat exchange is considered to occur outside the distillation system when it takes place at points other than the phase-contacting device, the terminal condenser, the terminal reboiler, or their equivalents. Compression of vapors involved in a distillation is considered to occur outside the distillation system. In order to distinguish from "distillation system" as just defined and the larger structure that includes further mechanisms needed to effect distillation, the term "distillation apparatus" is used herein to denote apparatus that includes at least one "distillation system" but includes other mechanisms as well: in FIGS. 1A, 2A, 3A, 4A, 5A, 6A, 6B, 7, 8A, and 8B, "distillation apparatus" is designated 101A to 101J, respectively.

Within a distillation system, or a portion of a distillation system, at relatively constant pressure, the temperature of a liquid or vapor stream within the system is inversely related to the volatility of the particular liquid or vapor stream. Thus, in a normal distillation column, the volatility of both liquid and vapor streams increases with height and the temperature decreases with height. In the present description, temperature of the distillation system at a particular point is used as a reference indicating the volatility at that point relative to other points in the column.

The phase-contacting portion of a distillation system may be idealized as having constant molar enthalpies of vapor and liquid throughout, constant temperature at any section perpendicular to the primary direction of liquid and vapor flows, and no unintended heat exchange with the environment. In practice, mixtures seldom have constant molar enthalpies of vapor and liquid at all compositions, passing liquid and vapor streams which are not in equilibrium have slight temperature differences, and a small amount of heat is exchanged with the environment due to imperfect insulation. However, these idealizations greatly simplify analysis and presentation, they seldom lead to conclusions which differ dramatically from real situations, and deviations from these ideal situations are well described in the literature. For the sake of simplicity and clarity these idealizations will be made in this discussion and the claims that follow.

The ratio between liquid and vapor flows, or internal-reflux ratio, within the phase-contacting portion of a distillation system is a critical parameter in design of distillation systems because it relates the compositions of opposite phases as they pass one another at a cross-section taken perpendicularly to the primary direction of flow. This relationship is given by equations (1) and (2)

$$Y_{i,r} = X_{i,d} - (L/V)_r(X_{i,d} - X_{i,r}) \qquad (1)$$

$$Y_{i,s} = X_{i,b} + (L/V)_s(X_{i,s} - X_{i,b}) \qquad (2)$$

where $Y_i$ is the mole fraction of component i in the vapor, $X_i$ is the mole fraction of component i in the liquid, L/V is the internal-reflux ratio, the subscripts d and b denote distillate and bottoms, respectively, and the subscripts r and s denote particular points in the rectifying and stripping sections, respectively. At the condition where $Y_i$ and $X_i$ of passing streams are in equilibrium at some point within the phase-contacting device, the internal-reflux ratio is at its limiting value because an infinite area of contact is necessary for mass transfer to occur between phases at equilibrium. This condition, referred to as a "pinched" condition, with $X_i$, $Y_i$, the temperature and pressure defining a "pinched point," is normally approached at one point in a binary separation, and at two points in a multicomponent separation. In practice, the extent to which the phase-contacting device is made to approach the pinched condition is generally a result of weighing the reduced energy consumption and the increased number of stages which accompany operation near the pinched condition.

If constant molar enthalpies and sections of the phase-contacting device with constant internal-reflux ratios are assumed, it is always possible to express the reboiler heat duty as a function of internal-reflux ratios and often as a function of a single internal-reflux ratio if the proper control volume is chosen. For example, in a conventional column with a feed at its saturation temperature, the reboiler heat requirements per mole distillate, $q_{reb}$, can be expressed in terms of the internal-reflux ratio in the rectifying section, $(L/V)_r$ $$q_{reb} = \lambda \left\{ \frac{1}{1 - (L/V)_r} - f_v(F/D) \right\} \qquad (3)$$

$\lambda$ = latent heat of vaporization
$f_v$ = molar fraction of vapor in the feed
$F/D$ = ratio of the molar flow rates of the feed and distillate It will be noted that when $(L/V)_r$ is at its limiting, in this case minimum, value, $q_{reb}$ is also minimized. In general, for a control volume including the terminal reboiler and a portion of the phase-contacting device, $q_{reb}$ can be calculated according to $$q_{reb} = \lambda(\Sigma(V/D)_{out,i} - \Sigma(V/D)_{in,j}) - Q_{aux}/D - W \qquad (4)$$

$(V/D)_{out,i}$ = the ratio of molar flows of vapor stream i leaving control volume to the distillate
$(V/D)_{in,j}$ = the ratio of molar flows of vapor stream j entering the control volume to the distillate
$Q_{aux}/D$ = the net heat flow, other than to the reboiler, per mole distillate across the control volume boundary with heat flow entering the control volume defined to be positive.
W = shaft work crossing the control volume boundary per mole distillate All V/D ratios can be expressed in terms of internal-reflux ratios, for example $$V/D = \frac{1}{1 - (L/V)_r}$$

in the rectifying section of a normal distillation system.

Though a single pinch point is sufficient to limit the operation of any distillation system, it may be noted that all points in the rectifying section other than the pinched point, if any, could operate at lower internal-reflux ratios without becoming pinched, and all points in the stripping section other than the pinched point, if any, could operate at higher internal-reflux ratios than the limiting value without becoming pinched. This observation has prompted several patents and papers dealing with changing the internal-reflux ratio by moving heat within the phase-contacting device, generally using compressors to increase the temperature of potential heat-source vapors, in such a way that reboiler duty is reduced (Seader), (Haselden), (Mah et al.), (Freshwater). In the extreme embodiment of this approach, the internal-reflux ratio can be imagined to be at its limiting value at every point in the phase-contacting device, thus implying reversible mass transfer throughout the phase-contacting device. The change in the internal-reflux ratio brought about by introduction of an amount of heat Q, to an otherwise adiabatic section of a phase-contacting device, assuming constant molar enthalpies of liquid and vapor, is given by equation (5):

$$\frac{L'}{V'} = \frac{L'' + Q/\lambda}{V' + Q/\lambda} \qquad (5)$$

where L' and V' are the molar flows of liquid and vapor, respectively, at a point in the phase-contacting device incrementally distant from the point of heat addition in the direction of decreasing temperature, $L''$ and $V''$ are the molar flows of liquid and vapor, respectively, at a point in the phase-contacting device incrementally distant from the point of heat addition in the direction of increasing temperature, and Q may be positive or negative in sign.

In addition to removal or addition of heat, the internal reflux ratio can be changed by removal or addition of mass. The change in the internal-reflux ratio accompanying introduction of a feed to a distillation system, the optimal point of feed introduction and the influence of the limiting internal-reflux ratio at the feed location on energy requirements are dealt with in any textbook on distillation (King) (Robinson & Gilliland). Consideration of the more general case of addition or removal of any stream from the phase-contacting device involves similar observations. The change in the internal-reflux ratio brought about by introduction of a stream of molar flow S consisting of a molar flow of vapor $V_s$ and a molar flow of liquid $L_s$ at a point in the phase-contacting region of a distillation system with the same temperature and pressure as the stream introduced, assuming constant molar enthalpies of liquid and vapor, is given by $$\frac{L'}{V'} = \frac{L'' - L_s}{V'' + V_s} \quad (6)$$

where $L'$, $V'$, $L''$, and $V''$ are interpreted as for equation (5)—except with reference to the point of stream introduction instead of heat addition, and the signs of the $L_s$ and $V_s$ terms are reversed if a stream is removed. The fewest number of stages of separation will be required if a stream is added to the phase-contacting portion of a distillation system at a point where the liquid and vapor compositions are as close as possible to the liquid and vapor compositions of the added stream, with equality of the key components getting priority in multicomponent distillation. Furthermore, bringing the compositions of passing liquid and vapor streams in the region of stream introduction as close to equilibrium as practical via adjustment of the external-reflux ratio and the flows of streams entering the column, given the constraints of a reasonable number of stages in the phase-contacting device, allows the internal-reflux ratio to be brought closer to its limiting value in a substantial portion of the phase-contacting device, thus reducing the heat required per unit distillate.

The inventive concepts herein, referred to as IHOSR distillation, involve combining the following two strategies:

(1) changing the internal-reflux ratio within the phase-contacting region by adding and removing heat using compressed vapors from the distillation system as the heat source and liquid from the distillation system as the heat sink, where at least one of the liquid and vapor, and possibly both, are withdrawn from the phase-contacting region of the distillation system at a temperature intermediate between the extreme temperatures of the system; and (2) returning the flows withdrawn as liquid and/or vapor from the phase-contacting region at an intermediate temperature, now with altered phase, using the same criteria normally employed for feed introduction, that is, introducing the feed at a point such that the composition of the feed is as close as possible to the composition of the corresponding phase(s) in the phase-contacting region of the distillation system, and the internal-reflux ratio above the point of feed introduction is made as small as practially possible. An equivalent statement to making this reflux ratio as small as practically possible is to make the opposite phases at the point of feed introduction as close to equilibrium as practically possible.

The net result of implementing IHOSR distillation is to reduce the quantity of heat which must be supplied per unit distillate output, while requiring a relatively small amount of compression work. In all cases, a second result is to bring the composition of passing vapor and liquid closer to the equilibrium compositions throughout most of the range of compositions in the column, thus minimizing internal irreversibilities due to mass transfer gradients.

Examples of the variety of ways IHOSR distillation can be applied to distillation problems encountered in a conventional system are shown in FIGS. 1A, 2A, 3A and 4A. IHOSR distillation may also be implemented in systems with the rectifying section at a higher pressure than the stripping section. FIG. 5A shows a scheme for combining IHOSR distillation with extractive distillation; FIGS. 6A, 6B, 7, 8A and 8B show ways to combine IHOSR distillation with fermentative production of volatile compounds. The influence of the IHOSR approach in various embodiments on the internal-reflux ratio is presented graphically using the McCabe-Theile method (King) in FIGS. 1B, 1C, 2B, 3B, 3C, 4B, 4C, 5B and 5C. All the examples presented involve binary separations because the McCabe-Theile method is more nearly rigorous when applied to binary separations than to multicomponent separations, though it may be applied to both (Hengstebeck), (Jenny and Cicalese). The role of the internal-reflux ratio, the principles dictating the effect of introduction of a given amount of mass or heat on the internal-reflux ratio, and the strategies for "custom tailoring" the internal-reflux ratio to the equilibrium relationship are not significantly different for either multicomponent separations or unconventional distillation apparatus. In the McCabe-Theile diagrams discussed below, the phase change of removed streams is assumed to be total, though partial phase changes may also be used, and the small amount of vapor generated when compressed vapors are returned to the pressure of the phase-contacting region is ignored. The explanation that now follows concerns the distillation apparatus 101A, 101B, 101C and 101D in FIGS. 1A, 2A, 3A, and 4A, respectively, the respective processes being called scheme 1, scheme 2, scheme 3 and scheme 4.

In the scheme shown in FIG. 1A, scheme 1, the returned condensate at 9 acts just like a second feed and may greatly relax the constraints on the internal-reflux ratio, and reduce $q_{reb}$, which are present with just the original feed at 15. FIG. 1B shows the operating line 32A for the case where the side-stream is withdrawn at 33A at the feed location and returned above the feed location at 33B. FIG. 1C shows the operating line 32B for the case where the sidestream is withdrawn above the feed location at 34B. (It will be appreciated that the operating line 32A, is a composite of three linear segments with different slopes (i.e., three different L/V ratios), the line 32B consists of four linear segments with different slopes, but each can be viewed as a single operating line whose shape is modified according to the present teachings.) It is also possible to withdraw vapor below the feed location. Scheme 1 is especially useful for dilute feeds.

Figure 2A:
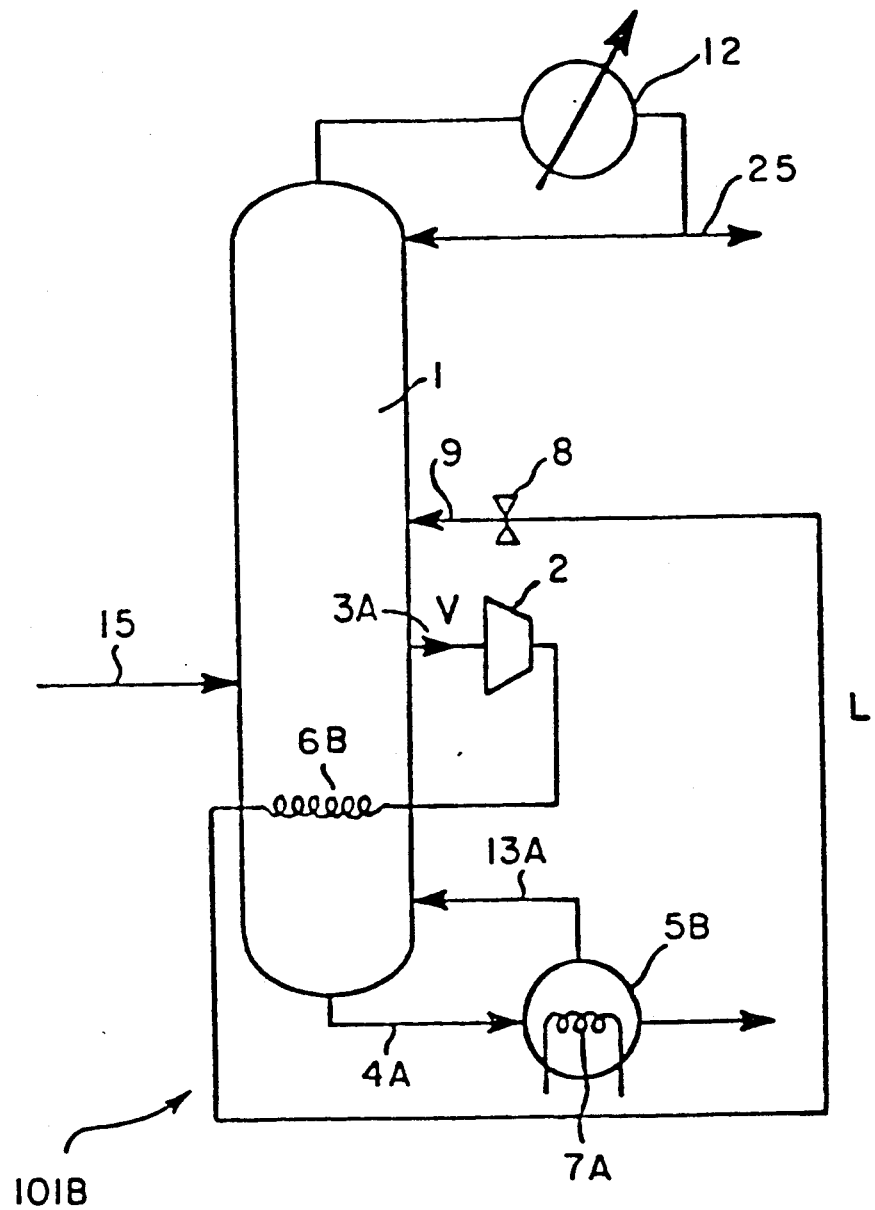
Figure 2B:
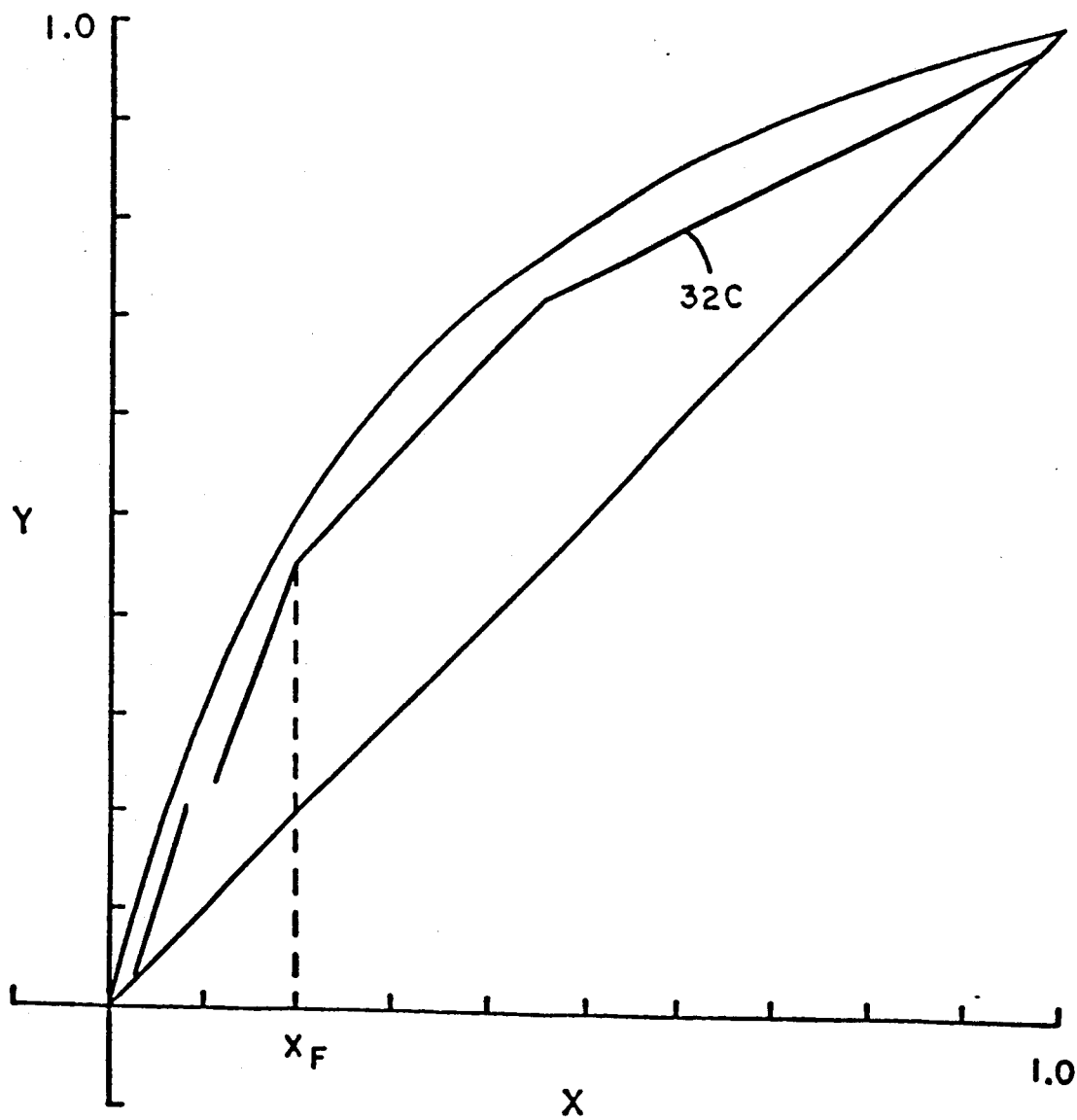

The scheme shown in FIG. 2A, scheme 2, is similar to scheme 1 except that the heat exchange is at 6B between the feed location 15 in FIG. 2A and the reboiler 5B. Compared to scheme 1, scheme 2 has the advantage that the temperature difference between the heat source and heat sink will be smaller and the disadvantage that the column may be pinched below the point of heat addition. The discontinuity in the operating line labeled 32C (FIG. 2B) can be explained by considering equations (2) and (5). Addition of heat makes $L'/V'$ less than $L''/V''$ as shown by equation (5), but the mass and component balances which gave rise to (2) dictate that all operating lines in the stripping section must be rays passing through $X_b$, regardless of $L/V$ for the case of constant molar enthalpies of liquid and vapor. As in scheme 1, the heat-souurce vapor may be withdrawn at the feed location, above the feed location, or below the feed location.

Figure 3A:
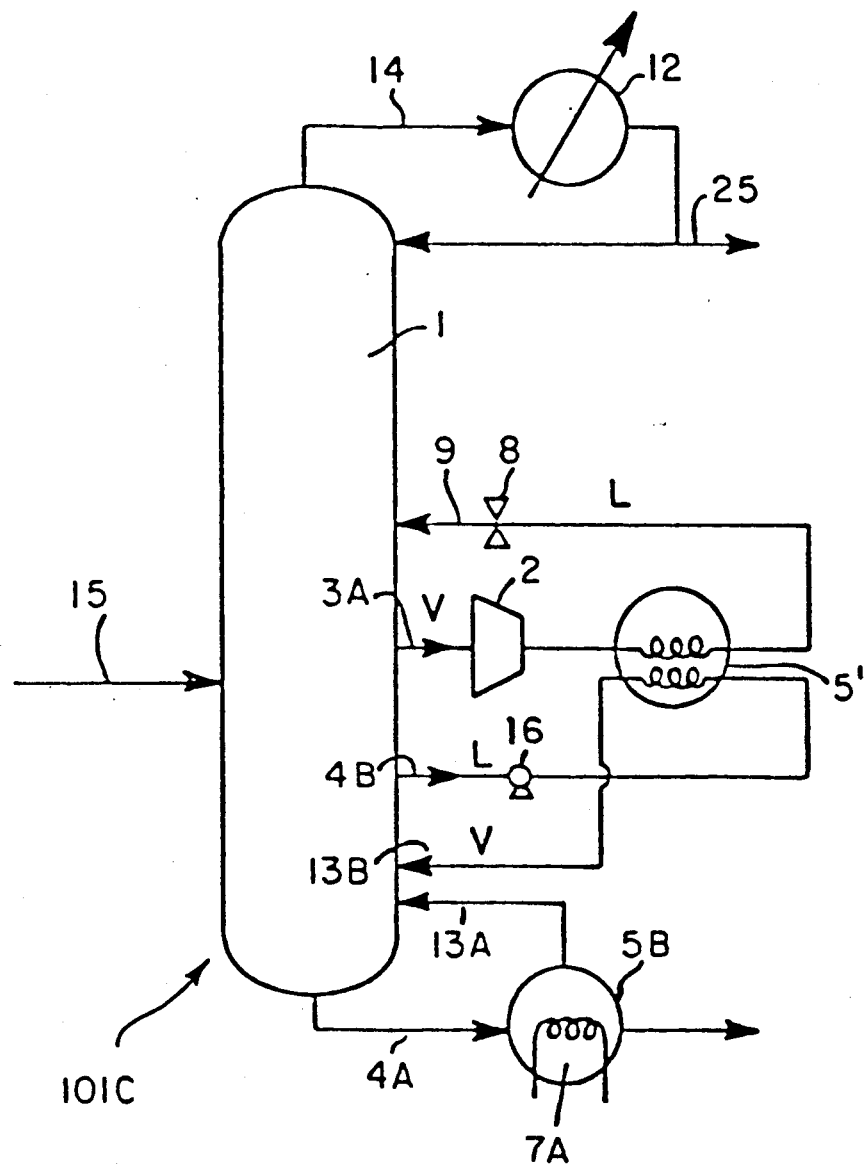
Figure 3B:
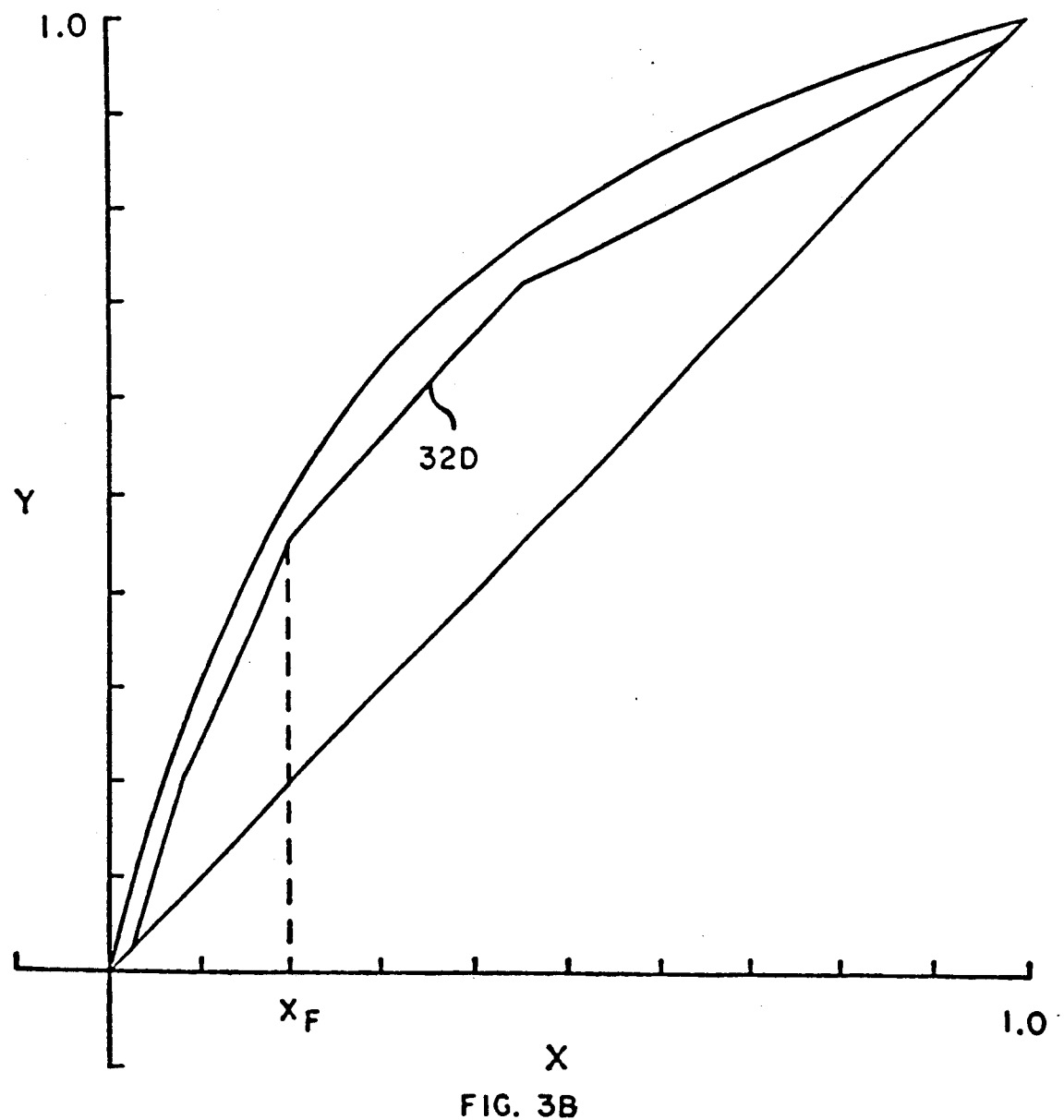
Figure 3C:
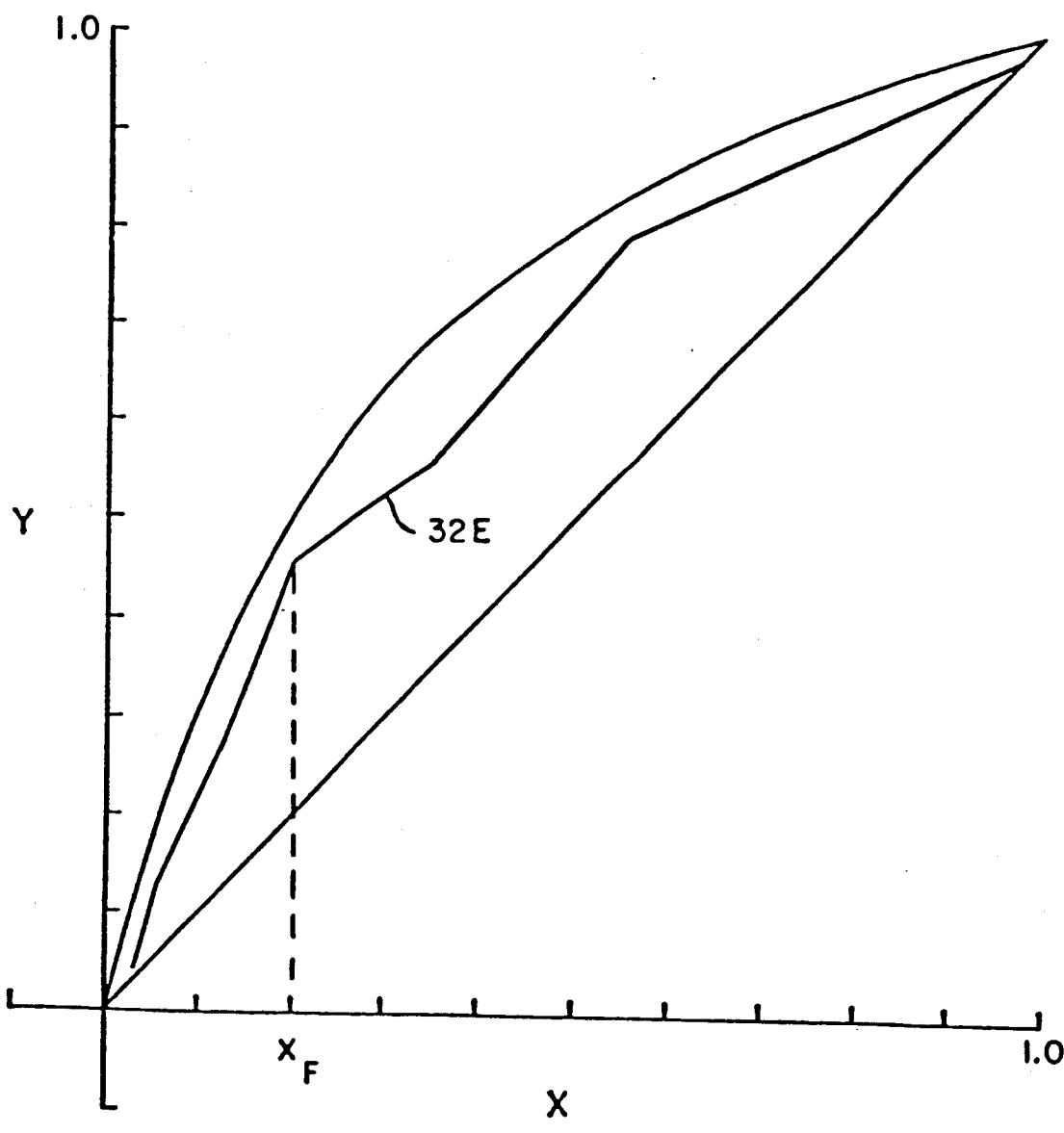

The scheme shown in FIG. 3A, scheme 3, perhaps the most versatile of all the schemes, can be designed with a small difference between the temperatures of heat sources and sinks—regardless of the feed concentration—because both the heat source and the heat sink are withdrawn from the phase—contacting region of the distillation system and so have temperatures intermediate between the reboiler 5B and condenser 12 in FIG. 3A. In FIG. 3B, the operating line shown at 32D represents the situation in which the heat-source vapors at 3A and the heat-sink liquid at 4B in FIG. 3A are both withdrawn from the same location as the feed 15 and are, therefore, at virtually the same temperature prior to heat exchange; heat transfer occurs in a heat exchanger 5'. Liquid withdrawn at 4B by a pump 16 is evaporated and returned to the column 1 as a vapor at 13B. Some compressor work is necessary in this situation, even if an infinite area is assumed for heat transfer, because the dew point temperature of the heat-source vapor falls during condensation while the bubble-point temperature of the heat-sink liquid increases during evaporation. In general, the compressor pressure ratio required to drive heat transfer between a given heat source and heat sink can be minimized by operating the heat exchanger countercurrently and so matching condensation of the hotter vapor with evaportion of the hotter liquid and condensation of the colder vapor with evaporation of the colder liquid. FIG. 3C shows an operating line 32E for the case in FIG. 3A in which the heat source vapor and the heat sink liquid withdrawals are above and below the feed location, respectively. This arrangement is likely to be useful for multicomponent separations because simultaneous pinch regions above and below the feed plate, which is the normal case for multicomponent distillation, can be both circumvented with a single heat pump while realizing substantial savings in reboiler duty. Scheme 3 has a further advantage in that there are very few theoretical stages between the heat source (the vapor withdrawn at 3A in FIG. 3A) and heat sink (i.e., the liquid withdrawn at 4B in FIG. 3A); in fact the heat source can be withdrawn below the heat sink in some cases, and thus the pressure drop within the phase-contacting region between heat source and sink can be very small.

Figure 4A:
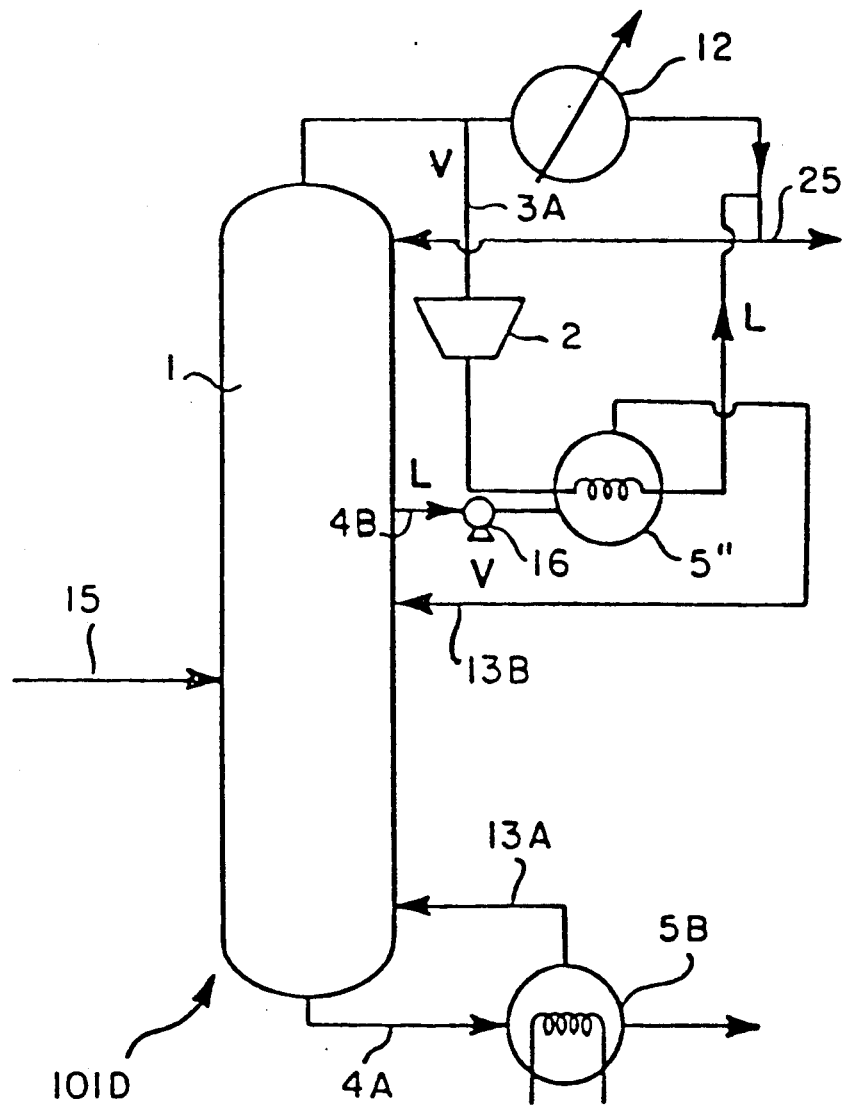
Figure 4B:
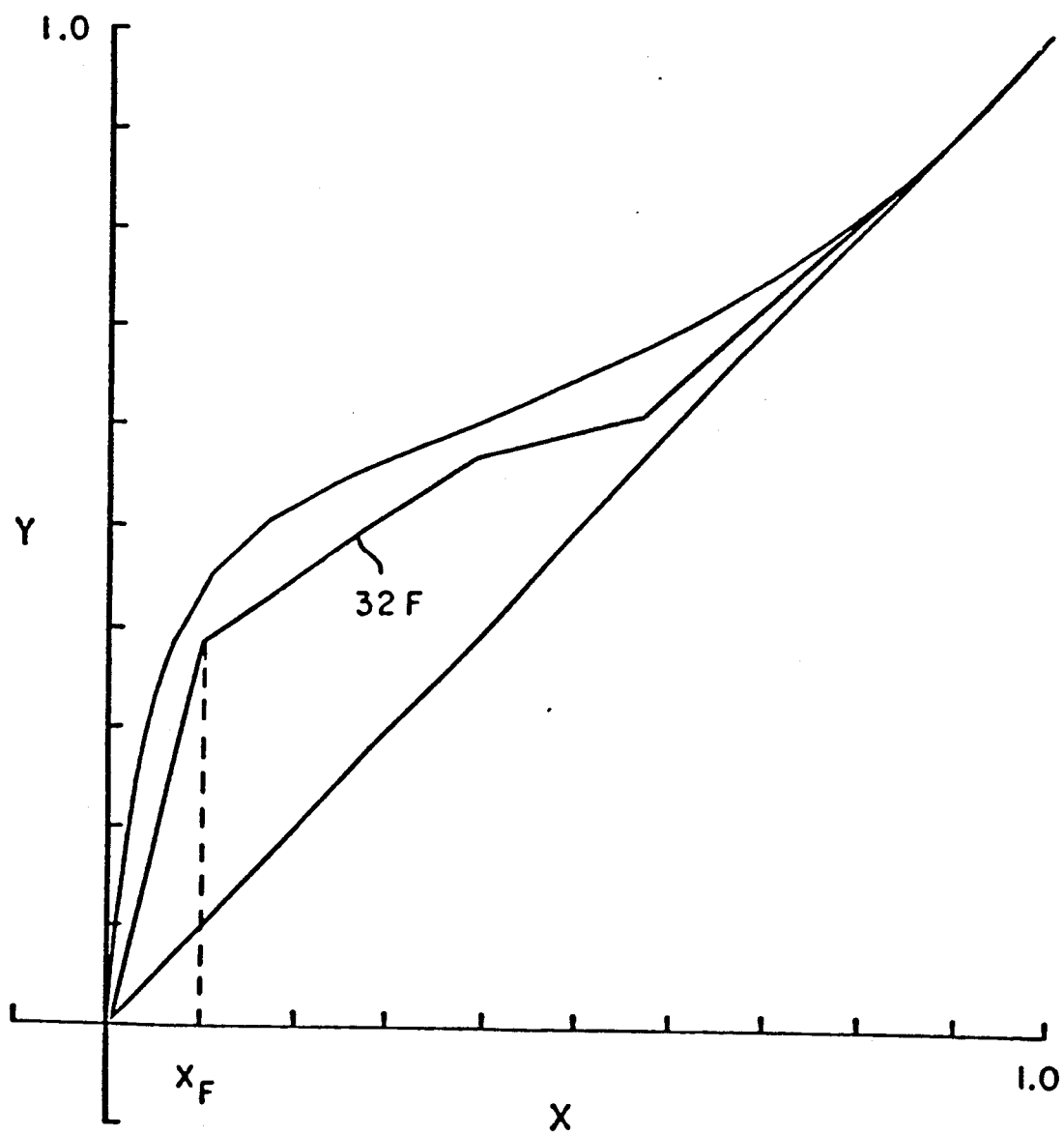
Figure 4C:
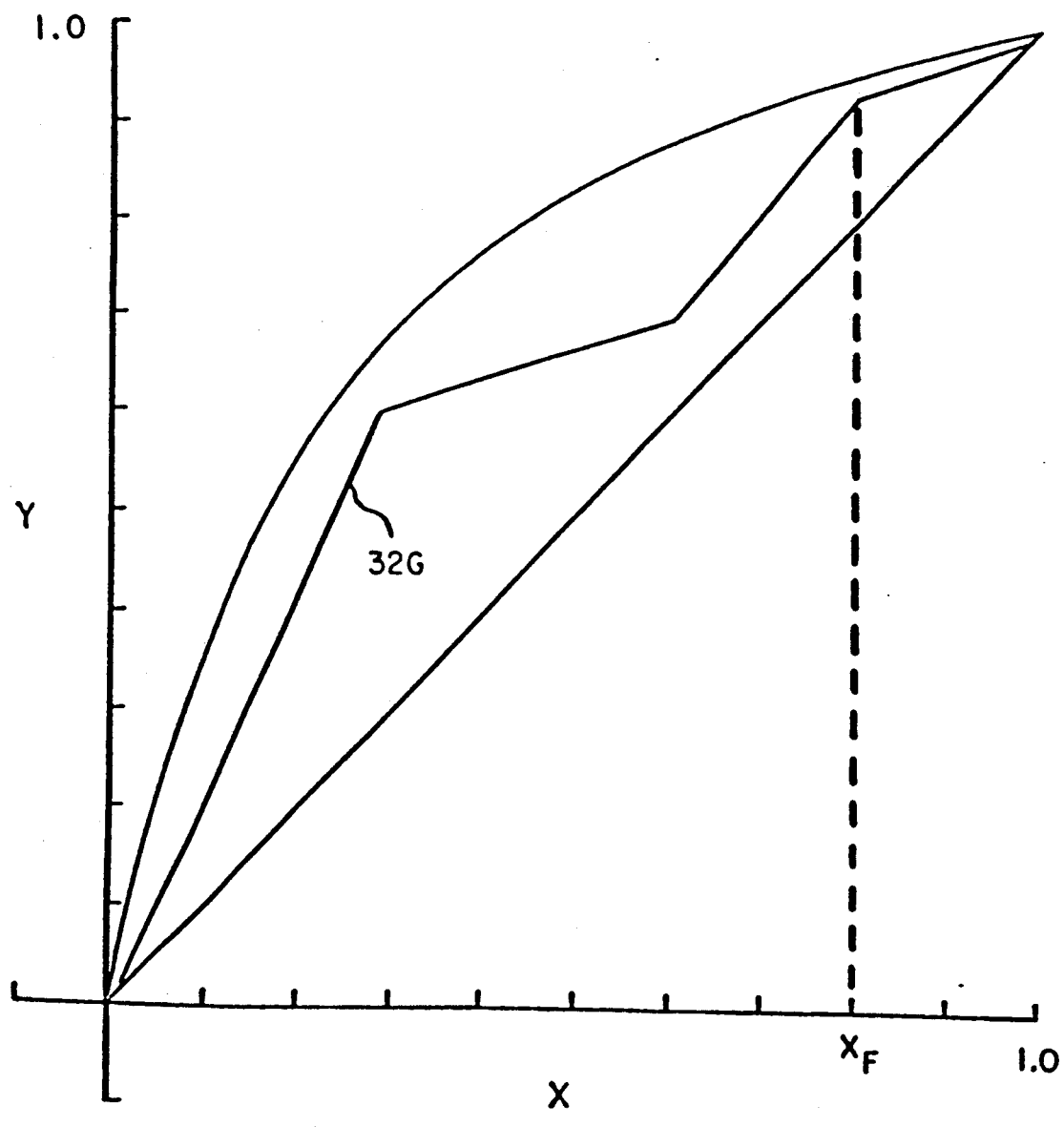
Figure 5A:
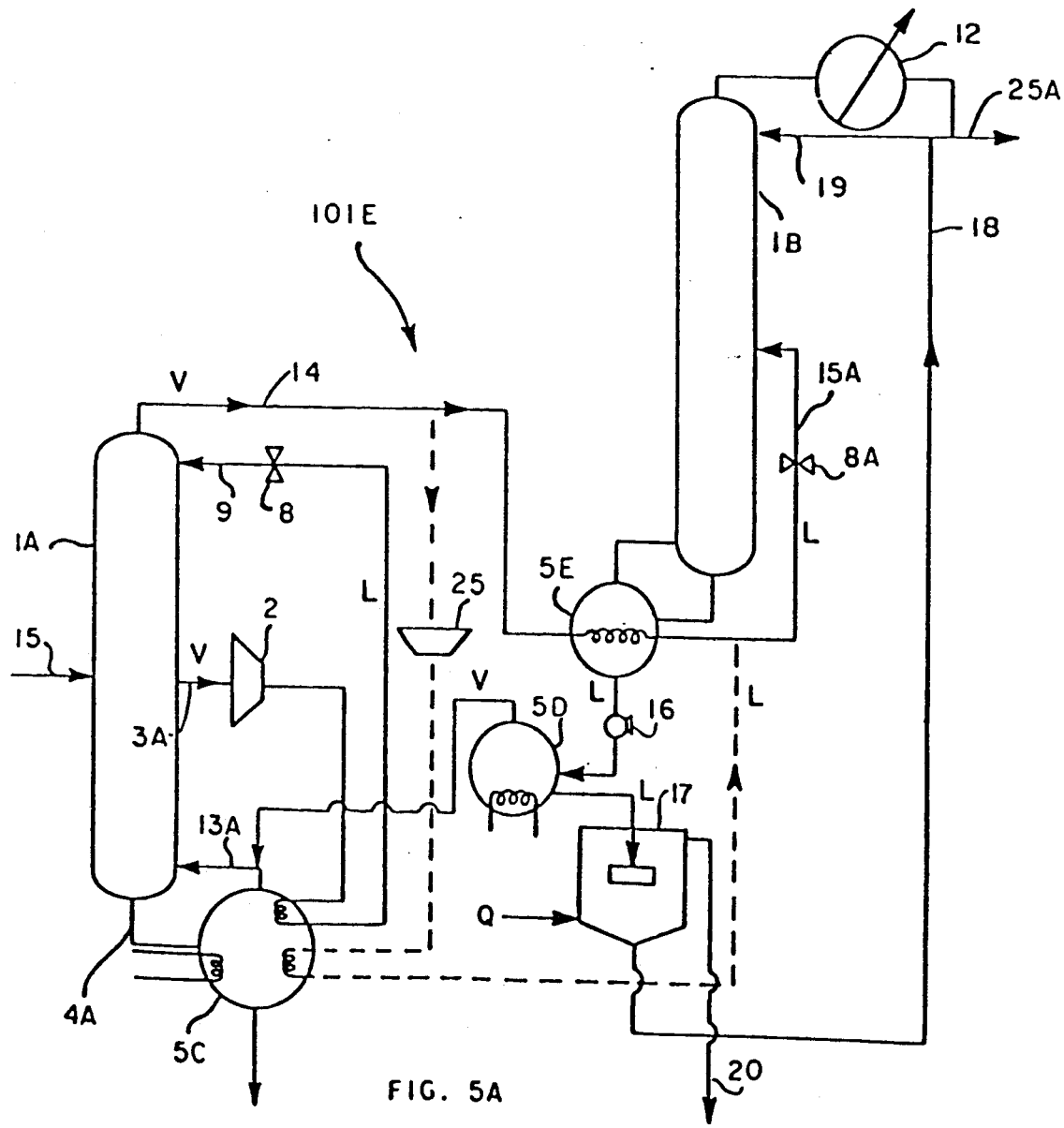

In the scheme shown in FIG. 4A, scheme 4, the overhead vapor withdrawn at 3A is the heat source and it is the liquid withdrawn at 4B that is returned with altered phase at a different location 13B from its withdrawal point. Scheme 4 is useful in the case of either a "tangental pinch," in which case the liquid removal point is best above the feed location (see the operating line 32F in FIG. 4B), or a concentrated feed, in which case the liquid removal is best below the feed location (see operating line 32G in FIG. 4C).

The IHOSR technique may be implemented in a single column where a vapor sidestream is removed, compressed and returned, as in schemes 1 through 4. The technique may also be implemented in a distillation system with the rectifying section at a higher pressure than the stripping section. When the rectifying section has a higher pressure than the stripping section, the temperature of at least portions of the rectifying section is higher than at least portions of the stripping section. This arrangement allows heat transfer between the stripping and rectifying sections without compression of sidestreams per se. In addition to moving heat in this manner, reintroduction of withdrawn streams at the preferred point in the column (see strategy 2 above) increases the power of the two-column/two-pressure system over and above that realized by previous persons (Haselden) (Seader).

Figure 5B:
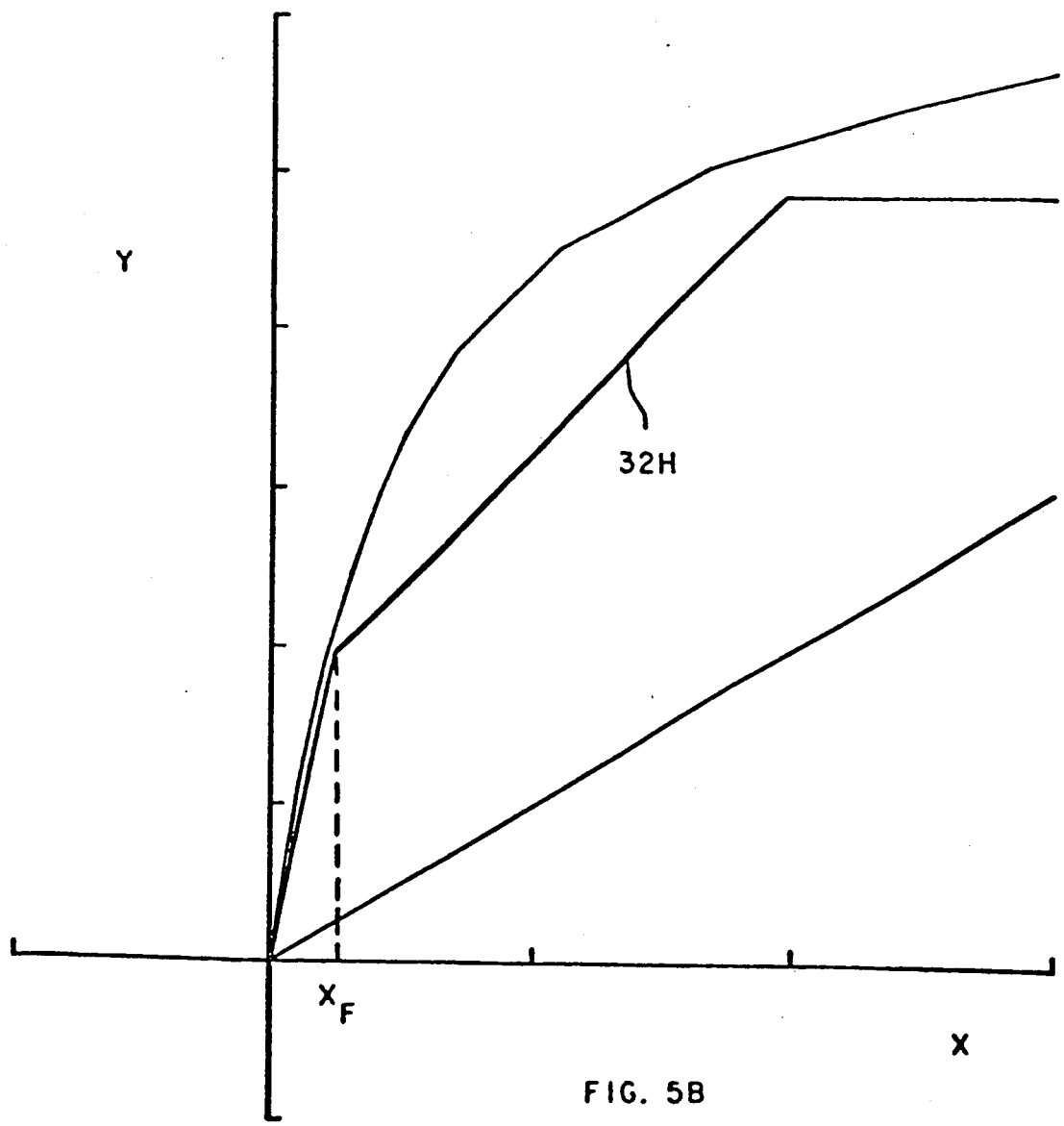
Figure 5C:
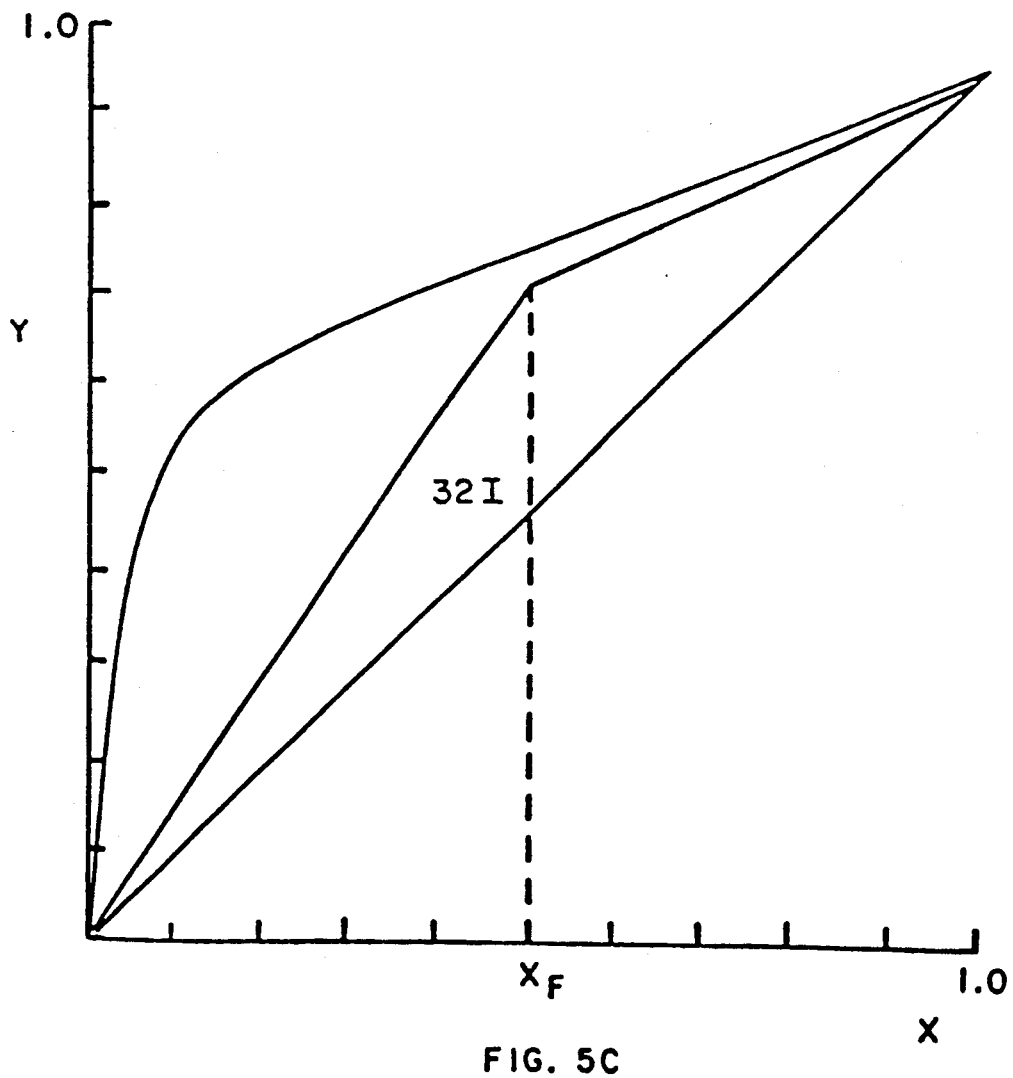

Schemes 1, 2 and 3 are all capable of efficiently concentrating a dilute feed. FIG. 5A, scheme 5, shows a process for producing ethanol more pure than the azeotrope from a relatively dilute feed, as is obtained from fermentation, which uses an IHOSR-enhanced column 1A to achieve partial purification, an extractive distillation column 1B employing salt as a separating agent (a variety of salts may be used, but potassium acetate is one of the better salts for the ethanol-water system (Cook et al.)), and a salt-recovery system. The initial purification provided by the IHOSR column 1A is very important to this process. The overall energy requirements of the system are very low (see example below) because of the efficiency of the IHOSR column 1A, the heat integration between the two columns 1A and 1B and the low-reflux ratio which may be used in the second column 1B due to the concentrated stream leaving column 1A at 14; salt recovery is facilitated because the feed to the second column at 15A left the IHOSR column 1A as vapor at 14 and so contains no particulates which would accumulate in the salt-recovery system, and the initial purification in the IHOSR column 1A means that the salt is diluted by the feed to the second column 1B to a relatively small degree. The operating lines shown at 32H and 32I in FIGS. 5B and 5C represent vapor and liquid composition in the columns 1A and 1B, respectively, in FIG. 5A. The equilibrium curve in FIG. 5C is for the case of 12.5 mole % potassium acetate as reported by Cook and Furter and has no azeotropic point.

The distillation apparatus 101E in FIG. 5A, in addition to the elements expressly addressed previously herein, includes reboilers for the two columns 5C and 5E. In the apparatus 101E, it is important to balance the heat available from the vapors entering the reboiler 5E and the heat needed to generate the required vapor flows in column 1B. This heat balance can usually be achieved by proper selection of the vapor withdrawal point 3A. However, a second heat pump such as indicated by the dashed lines in FIG. 5A may be included. The salt-recovery system noted above includes a pump 16, an evaporator 5D and a spray dryer 17, which produces crystalized salt in steam 18 which is added to the reflux stream 19 of column 1B. Vapor from the evaporator 5D, can be introduced directly to the stream of stripping vapors 13A entering column 1A, thereby decreasing the amount of heat which must be added to the reboiler 5C from external sources.

A variety of volatile compounds can be produced from a suitable substrate via fermentation. The best known examples of fermentations yielding volatile compounds are the ethanol fermentation carried out by species of yeast and the acetone/butanol/ethanol fermentation carried out by some bacteria of the genus Clostridium. A common feature of fermentative production of volatile compounds is the inhibition of the rate of fermentation by the fermentation products. In systems in which volatile products are produced continuously, continuous removal of these products can keep their concentration low and so free the resident organisms from end-product inhibition, allowing higher fermentation rates and smaller fermentors. In addition, the continuous removal of volatile products in a vapor stream may allow the metabolic heat generated in the course of the fermentation to be utilized; the amount of this heat can be significant (e.g., 50 percent or more) relative to the heat requirement of the distillation system. The benefits of removing end-product inhibition and recovering metabolic heat can be realized by integrating fermentation and IHOSR distillation.

Figure 6A:
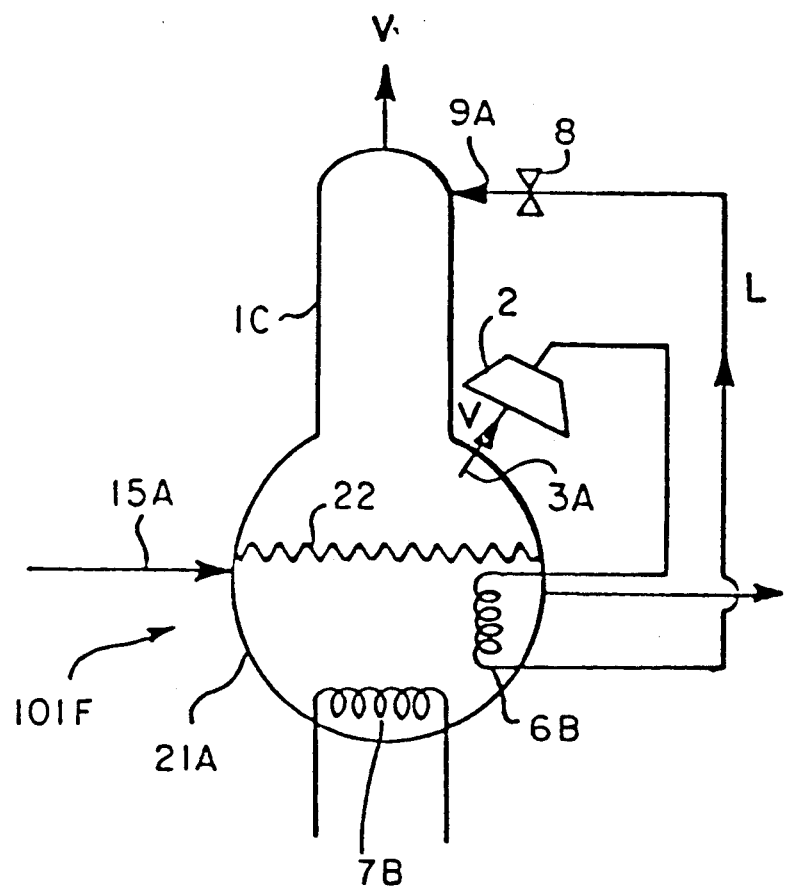
Figure 6B:
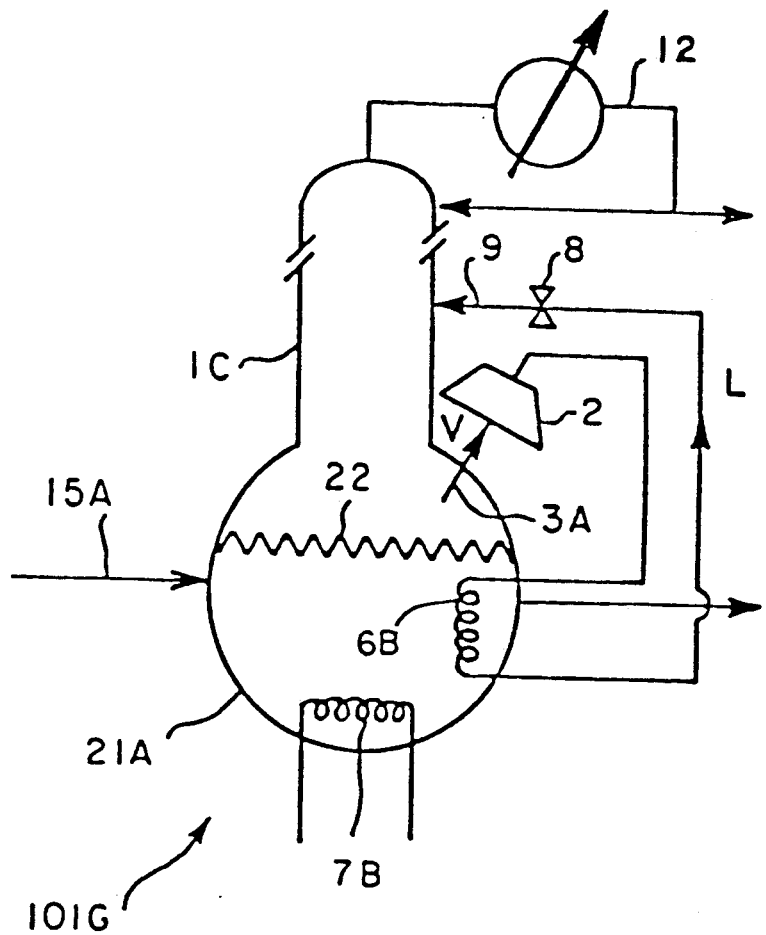

FIGS. 6A and 6B show apparatus 101F and 101G in which vapor is removed from a fermentor 21A operated at a pressure such that the fermentation broth boils at a temperature compatible with the requirements of the resident organisms. Each system is a variation on scheme 1, where the points of vapor removal at 3A and heat return (by a heat exchange coil 6B) are essentially at the same temperature. The liquid present after the vapor is condensed in the coil 6B, which essentially becomes the column reflux when it is reintroduced at 9A, has the same composition as the vapor in equilibrium with the liquid in the fermentor and is considerably enriched relative to the fermentor liquid. In FIG. 6A this liquid is stripped in a column 1C which gives rise to a distillate vapor which may be essentially in equilibrium with the liquid feed at 9A, and so richer than the fermentor broth by the equivalent of two equilibrium stages at total reflux. In FIG. 6B further purification is achieved using the IHOSR return stream introduced at 9 as the column feed. The input at 15A to the fermentors 21A in FIGS. 6A, 6B (and also to fermentors 21B in FIGS. 8A and 8B) is the liquid feed containing nutrients and substrate, except for the case of a gaseous substrate, needed in the fermentation process; the level 22 indicates liquid level in all the fermentors.

Figure 7:
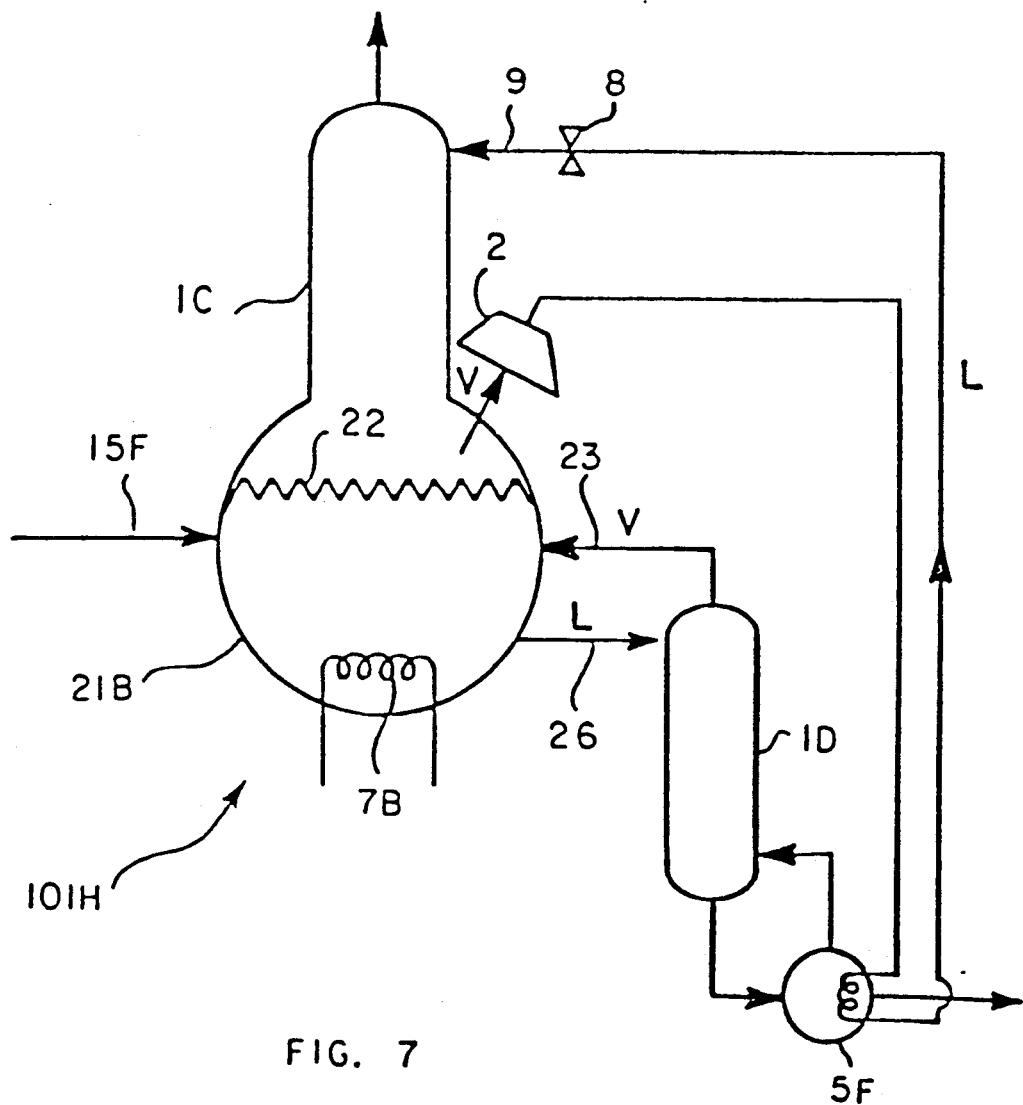

FIG. 7 shows a variation on the arrangements in FIGS. 6A and 6B in that heat is pumped from the fermentor 21B in FIG. 7 to a reboiler 5F, for a column 1C to strip the effluent from the fermentor; vapor from the column 1C (which strips the liquidfermentor effluent) is introduced at 23 into the fermentor directly.

Figure 8A:
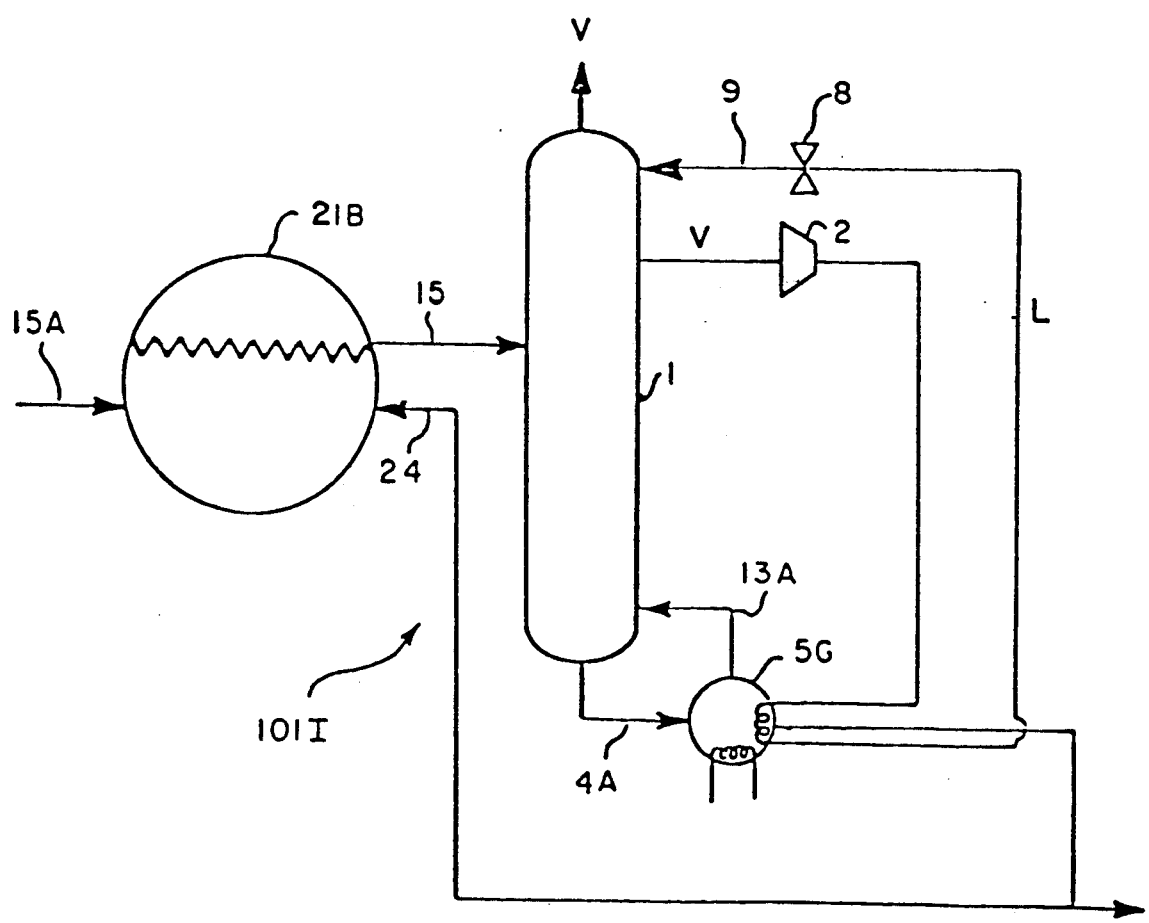
Figure 8B:
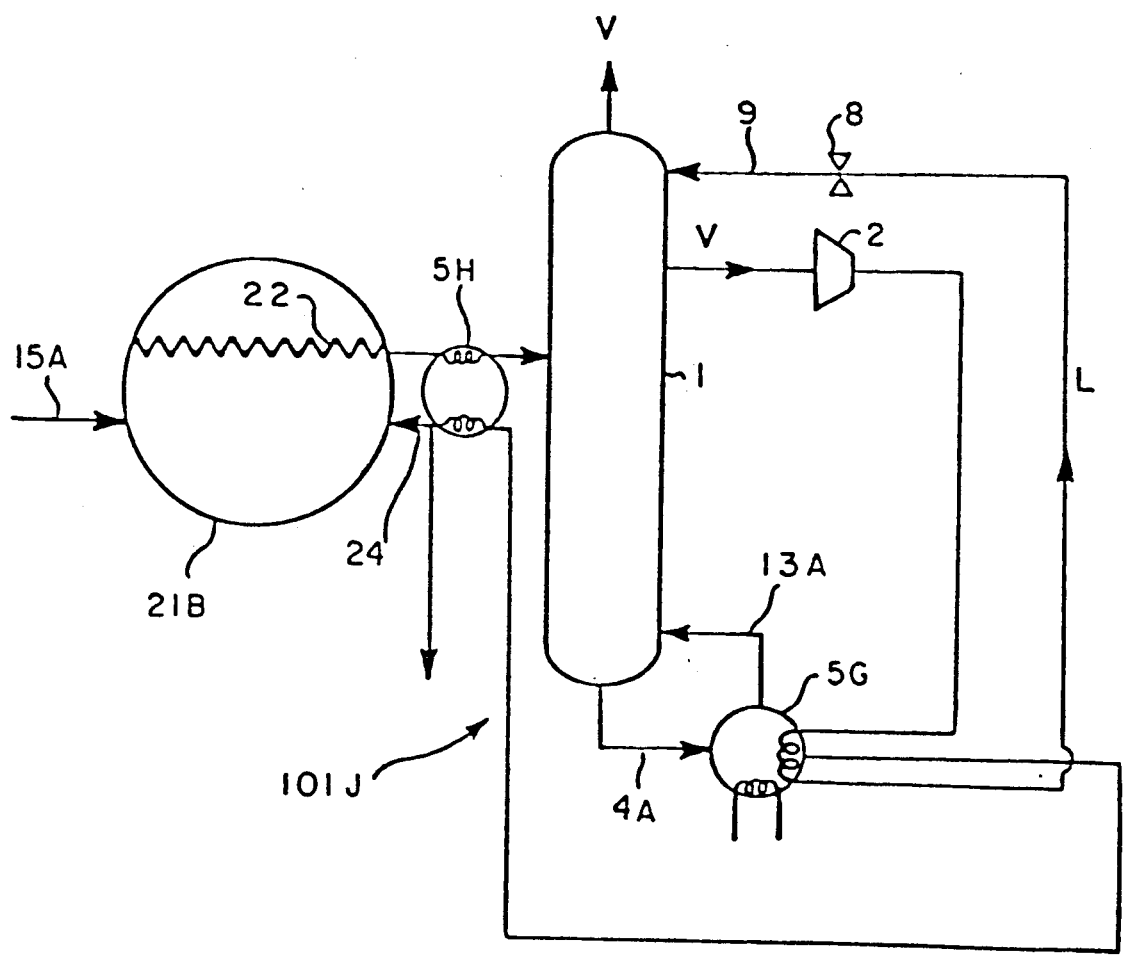

In FIGS. 8A and 8B, only a liquid stream is withdrawn from the fermentor 21B; vapor is withdrawn from a column 1 adjoining the fermentor 21B, and the IHOSR technique is implemented in this column. A portion of the stripped liquid effluent leaving the distillation system (i.e., from a reboiler 5G in FIGS. 8A and 8B) is returned to the fermentor 24 so that cells and the substrate remains in the system for a length of time sufficient to allow the desired conversion to be achieved. FIG. 8B shows the same system as shown in FIG. 8A with countercurrent heat exchange at 5H between the fermentor effluent and stripped recycle stream. The scheme shown in FIG. 8B is especially attractive in that neither the fermentor nor distillation system need be operated at reduced pressure. The fermentor 21B can be operated at a pressure such that the broth temperature is far below its bubble point, and the column 1 in FIG. 8B can be operated at a temperature far in excess of that which could be tolerated by the organisms in the fermentor, providing that some means of preventing the organisms from entering the distillation system, such as centrifugation, filtration, immobilization, or a flocculating strain, is employed.

Table 1 below displays calculated values for the heat and work requirements, the number of stages and the external-reflux ratios for several example separations using IHOSR distillation and, where possible, is compared to conventional distillation with an adiabatic column. Separation 1 involves separating a dilute ethanol-water mixture with ethanol $(X_f)=0.0039$ (~1% by weight), to a distillate with mole fraction $(X_d)=0.8$ (~91% by weight), and a bottoms with mole fraction $(X_b)=0.000039$. Separation 2 involves separating a concentrated ethanol-water mixture with $X_f=0.1$ (~22% by weight) to a distillate with $X_d=0.8814$ (~95% by weight) and a bottoms with $X_b=0.001$. Separation 3 involves separating an ethanol-water mixture of intermediate concentration with $X_f=0.02437$ (~6% by weight) to a distillate with $X_d=0.9748$ (~99% by weight) and a bottoms with $X_b=0.0002437$. For separation 1, IHOSR scheme 1 will be employed, for separation 2, IHOSR scheme 4 will be employed, for separation 3, the two-tower system (shown in FIG. 5A) using salt as a separating agent, in this case potassium acetate at 12.5 mole %, will be used.

For separation 1, using IHOSR distillation reduces the heat requirement from 59,494 BTU/gal to 7,398 BTU/gal compared to the conventional case, while using 1,917 BTU/gal of work. This reduction is made possible by alleviating the limitation of the external-reflux ratio imposed by the low-feed concentration in the conventional case. The number of stages is increased from thirty-five for the conventional case to forty-eight for the IHOSR case because passing streams are brought closer to equilibrium by the IHOSR technique. The increase in the number of stages is relatively small because most of the stages are required for stripping the dilute feed in both cases. The external-reflux ratio is lowered from 19.39 for the conventional case to 2.19 for the IHOSR case. For separation 1 and the operating parameters listed in Table 1, the molar ratio of vapor removed from the column and compressed to the flow of distillate, S/D, is 17.2. If less material were removed in relation to the distillate, then the external-reflux ratio would have to be higher and the reduction of the heat duty would be smaller than indicated in Table 1; if more material were removed, then the column would become pinched to a greater extent at the point of reintroduction of the sidestream, tending toward an infinite stage requirement. The average $\Delta T$ for heat transfer from the compressed vapor to the reboiler, was the minimum possible while still having the last drop of vapor condense at 0.5° C. hotter than the reboiler temperature. During the course of condensation the temperature of the ethanol-water mixture fell by over 10° C. The withdrawn vapor had to be compressed to 1.43 atmospheres to achieve the indicated $\Delta T$.

For separation 2, using IHOSR distillation reduces the heat requirement from 19,458 BTU/gal to 7,018 BTU/gal compared to the conventional case, while using 376 BTU/gal work. This reduction is made possible by using a heat pump from the overhead vapor to bring about a high internal-reflux ratio where it is needed, near the distillate composition, while having a lower internal-reflux ratio elsewhere. In the calculations used to generate Table 1, the external-reflux ratio for separation 2 with conventional distillation was set at 1.25 times the minimum reflux, external-reflux ratio, a conventional value. For the IHOSR case, the external-reflux ratio was allowed to be somewhat higher than 1.25 times the minimum to avoid the "tangental pinch" near the distillate composition. Because of this choice, the stage requirement for the IHOSR case, sixty, is lower than for the conventional case, sixty-five. S/D is 5.43. If S/D were made higher, then fewer stages would be required, the internal-reflux ratio near the distillate composition would increase, and the work requirement would increase; there would be no effect on the heat requirement as long as the internal-reflux ratio below the region effected by the heat pump were kept constant. If S/D were made lower, then more stages would be required, and the internal-reflux ratio near the distillate composition would decrease until the column became completely pinched. The ΔT of 5.1° C. for heat transfer from the compressed overhead vapor to the withdrawn column liquid was arbitrarily selected. Lower values than 5.1 are possible because the temperature of the heat-source vapor and heat-sink liquid remain relatively constant during reciprocal phase change for this case. The withdrawn vapor had to be compressed to 1.3 atmospheres to achieve the indicated ΔT.

For separation 3, 4,561 BTU heat/gal and 592 BTU work/gal are required to enrich a 6 wt. % ethanol feed to a 99 wt. % ethanol distillate. These energy requirements may be compared with a value of roughly 27,000 BTU heat/gal for the separation of a ten weight % feed using azeotropic distillation and adiabatic distillation columns (Busche). The total number of stages required by both the high- and low-pressure columns is twenty-nine, a low value because significant pinch regions are never encountered. The value of S/D in the high-pressure column is 3.36. If S/D were greater, the column would be pinched near the composition of the leaving vapor; if S/D were smaller, the composition of the leaving vapor would not be as great but fewer stages would be required. In this example, vapor is removed at the feed plate of the high-pressure column, and the vapor flow leaving this column is just sufficient to generate the required vapor flow in the low-pressure column. For a different feed composition, a balance between the vapor leaving the first column and the vapor requirement of the second column could be achieved either by moving the point of vapor withdrawn to a location other than the feed plate, or introducing a second heat pump operating between the vapor leaving the high-pressure column and its reboiler. The majority of the heat used for salt separation, about 95 percent for the case under consideration, can be recovered by evaporating the salt and using the vapor thereby generated in the high-pressure column in lieu of vapor supplied by an external heat source. The heat necessary to dry the saturated salt solution leaving the evaporator to produce solid salt is very small because of the high solubility of the salt in the completely stripped bottoms and the low-flow rate of the bottoms relative to the distillate. As in separation 1, the indicated ΔT, 7.1° C., is the minimum value possible while maintaining the heat source at least 0.5° C. hotter than the heat sink. The withdrawn vapor had be to compressed to a pressure of 1.91 atmospheres to achieve the indicated ΔT.

Integrating fermentation and distillation via removal of a volatile product from a continuous fermentor potentially offers increased fermentor productivity, due to alleviation of inhibition of the rate of fermentation by the fermentative end-products and increasing the residence time of the cells and substrate in the fermentor relative to that based on the feed rate, and decreased distillation heat requirements, due to utilization of the metabolic heat released during fermentation. The increased residence time of the cells results from the fact that a portion of the liquid entering the fermentor leaves in a stream enriched in volatile product which contains neither cells nor substrate (see FIGS. 6A, 6B, 7, 8A and 8B).

The productivty of a fermentor (mass product/(fermentor volume*time)) can be expressed as the product of the cell concentration, X (mass cells/volume), and the specific product production rate, q, (mass product/-(mass cell*time)). A mass balance on substrate gives the cell concentration in terms of the cell yield, $Y_x$ (mass cells made/mass substrate consumed), the entering and leaving substrate concentrations $S_o$ and S, respectively, (mass/volume), and the ratio of the flow of cell-containing effluent to influent f (unitless)

$$X = Y_x^*(S_o - f^*S)/f \qquad (7)$$

The expression for q will depend on the specific fermentation considered. For the ethanol fermentation via yeast at constant substrate concentration, q is related to the ethanol concentration, P, in a roughly linear fashion (different studies are not in complete agreement, see Ghose and Tyagi)

$$q \sim (1 - (P/P')) \qquad (8)$$

where P' is an empirical constant.

As an example of the increase in fermentor productivity by continuous product removal, consider two hypothetical continuous fermentors producing ethanol from a 13 wt. % glucose solution via yeast fermentation with both fermentors achieving 99 percent substrate utilization. Fermentor 1 is maintained at 1 wt. % ethanol via removal of a vapor stream of 11 wt. % ethanol, with 52 percent of the mass entering the fermentor leaving in this enriched stream, or f=0.48. Fermentor 2 is a continuous fermentor without continuous product removal, f=1, save in the liquid-fermentor effluent at the same concentration as the liquid in the fermentor. At 99 percent substrate utilization the ethanol concentration in fermentor 2 is 59.2 g/l. Applying equations (7) and (8) to fermentors 1 and 2 with $Y_x$ assumed constant at 0.1, indicates that the productivity in fermentor 1 would be 2.1 times higher than the productivity in fermentor 2 due to the increased cell concentration, and an additional factor of 2.2 times higher due to alleviation of ethanol inhibition. Thus the productivity is 4.6 times higher with continuous ethanol removal than without it. More dramatic increases are found for higher substrate concentration.

If the small effects of the $CO_2$ given off during the fermentation on the compression work requirement, and of operating at reduced pressure where necessary on the vapor-liquid equilibria, are neglected, the energy requirement for separating a 1 percent ethanol stream continuously removed from a fermentor are the same as in Table 1 for separation 1. Comparison of the energy requirements for separating 1 percent ethanol by IHOSR and conventional distillation, and for separating 6 percent ethanol, a more typical concentration for the production of ethanol, by conventional distillation, demonstrates that operation at 1 percent becomes much more attractive when IHOSR distillation is used as opposed to conventional distillation. Generally speaking, IHOSR distillation may allow more product-sensitive organisms to be used than hitherto practical because it lowers the energy required to separate dilute solutions. For such product-sensitive organisms, continuous product removal is especially important because the productivities possible without it are very low.

Microcalirometric studies have found that considerable amounts of heat are liberated during fermentation. For the case of the ethanol fermentation, approximately 30 Kcal/mol glucose are released (Fardeau et al.). This quantity corresponds to roughly 4,000 BTU/gal ethanol, depending slightly on the distillate composition. Examination of the heat requirement for the separations in Table 1 via IHOSR distillation demonstrates that the quantity of heat available from fermentation is a very significant fraction of the heat required for separation, 54 percent, 57 percent, and 88 percent for separations 1, 2, and 3, respectively. Metabolic heat recovery is most easily accomplished in situations where vapor is removed directly from the fermentor as in FIGS. 6A, 6B and 7.

superheated stream (number 16) is then condensed in the column reboiler R1, and returned as reflux to the top of column C2 (stream 17). This condensation provides a substantial portion of the heat required by the reboiler. The bottoms of the IHOSR column contains essentially pure water.

The vapor distillate of the IHOSR section is condensed and fed as a saturated liquid into the extractive column C3, operated at a higher pressure, where extractive distillation using, for example, potassium acetate, takes place. Potassium acetate, a non-volatile component, leaves with essentially water only at the bottoms of the column (stream 7). It is later concentrated in evaporator E1, and dried in drum dryer D1, to be recirculated in solution with ethanol as reflux (stream 14). The column overhead stream, containing 99% weight ethanol, is condensed to provide the evaporator heat duty and the remaining part of the IHOSR reboiler duty. Thus, the energy consumption of the process is essentially a result of the heat duty of the extractive column reboiler R2 and the power requirements of the comprssor VB1.

The configuration of the Alternative IHOSR Process described above is an alternative to the previously presented version, in which the IHOSR column was operated at high pressure, using the heat of condensation of the vapor product to drive the extractive column.

TABLE 1

| | Energy requirements and operating parameters for illustrative separations by IHOSR and conventional distillation. | | | | | | | |
|---|---|---|---|---|---|---|---|---|
| SEPARATION STRATEGY | HEAT BTU/ GAL DISTIL- LATE | WORK BTU/ GAL DISTIL- LATE | NUMBER OF THEO- RETICAL STAGES | EXTERNAL- REFLUX RATIO (L/D) | (L/D) min | SIDE- STREAM RATIO (S/D)* | SIDESTREAM PRESSURE AFTER COMPRESSION (atm) | AVERAGE ΔT TO DRIVE HEAT TRANSFER (°C.) |
| 1. Conventional | 59,494 | — | 35 | 19.39 | 17.35 | — | — | — |
| IHOSR #1 | 7,398 | 1,917 | 48 | 2.19 | — | 17.20 | 1.43 | 7.0 |
| 2. Conventional | 19,548 | — | 65 | 6.17 | 4.94 | — | — | — |
| IHOSR #4 | 7,018 | 376 | 60 | 6.92 | — | 5.43 | 1.30 | 5.1 |
| 3. IHOSR #1 + multieffect + extractive | 4,561 | 592 | 29 | 1.00 | — | 3.36 | 1.91 | 7.1 |

*The sidestream ratio is the molar ratio of the flow of vapor removed and compressed to the distillate flow.
Basis of Calculations:
Constant molar enthalpy of all liquid and vapor streams is assumed regardless of pressure or composition.
All vapor-liquid equilibrium data and activity coefficients used are from published sources and were measured at 90° C.
Compression work is calculated assuming 75 percent isentropic efficiency and ideal gas behavior.
The small amount of vapor generated when the condensate derived from the heat-source vapor is returned to the column pressure is neglected.
The salt-containing bottoms of the low-pressure column in separation 3 is evaporated to saturation with complete recovery of the steam produced in the reboiler of the high-pressure column, the heat required to dry the saturated solution is calculated assuming a 75 percent dryer efficiency and is not assumed to be recovered.

The recovery of ethanol from fermentation broths is responsible for a significant portion of the cost, and often the largest share of the energy requirements for yeast-based ethanol production. For processes where substrate concentration, fermentor design or limitations of the fermentation agent require lower ethanol concentrations than those that can be produced by yeast, the incentive to develop energy-efficient alcohol recovery technologies is particularly great. Thermophilic bacteria represent a prominent example of alcohol-producing organisms which have potential advantages in comparison to yeast, but produce ethanol at relatively low concentrations.

Figure 9:
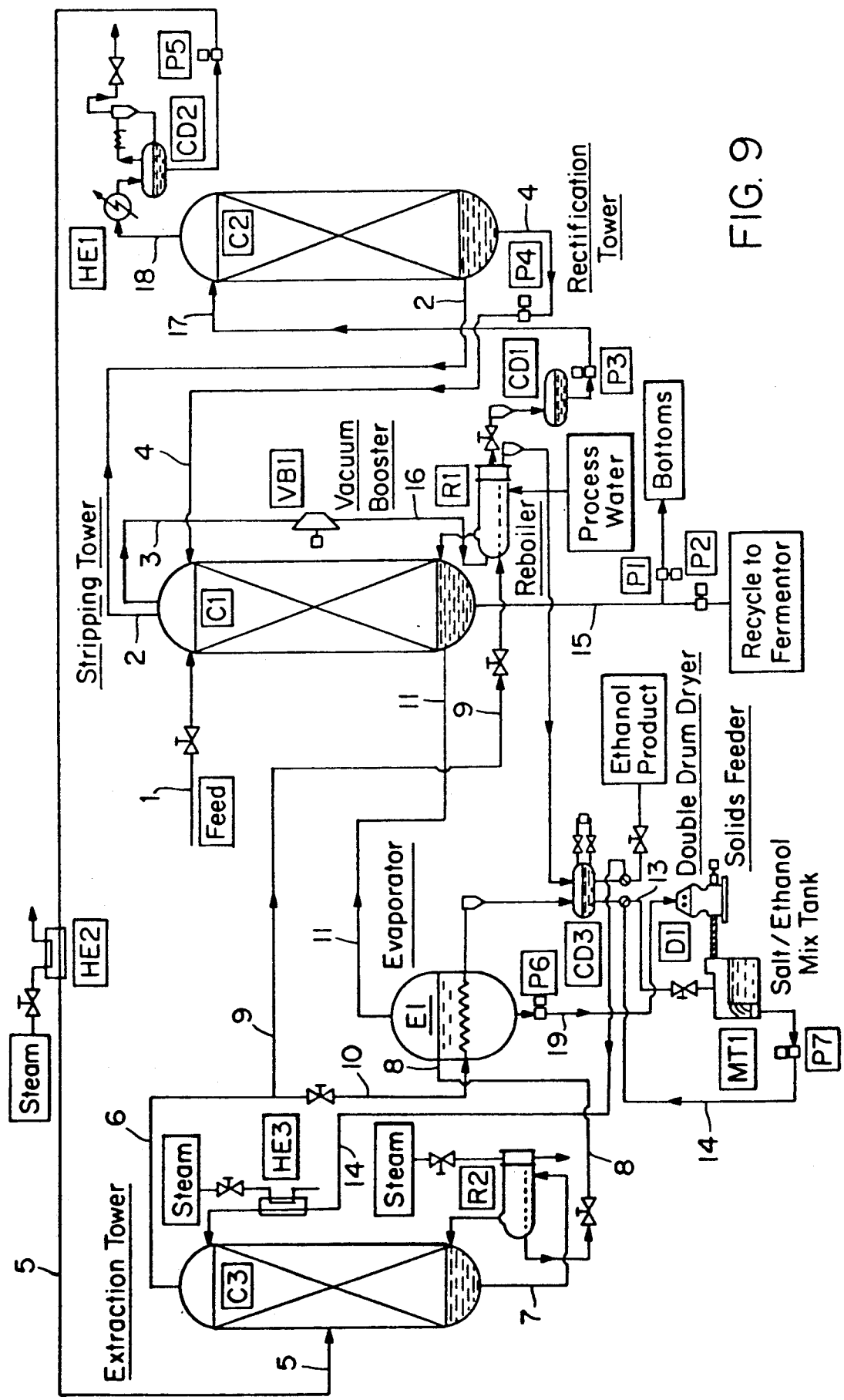
FIG. 9 is a schematic flow diagram of the Alternative IHOSR Process particularly adapted for the recovery of ethanol from dilute ethanol/water mixtures.

FIG. 9 shows a flowsheet representation of an alternative process, referred to herein as Alternative IHOSR Process. Two distillation columns that comprise the IHOSR section (columns C1 and C2), can be conceptually treated as one single column; a dilute ethanol solution (stream 1) is fed at the same stage where a portion of the vapor stream is taken out (stream 3). This vapor stream is sent to a compressor (VB1), where it is converted into superheated vapor at a higher pressure; the

COMPUTER SIMULATION OF THE ALTERNATIVE IHOSR PROCESS

A computer model to simulate the steady-state behavior of the Alternative IHOSR Process was developed, with the following objectives:

1. To facilitate the rapid estimation of equipment sizes and energy flows, for different feed concentrations, product qualities and ethanol production volumes.

2. To investigate the sensitivity of economic projections to ethanol concentration in the feed, assumed steam price and some economic parameters.

The state-of-the-art flowsheet simulation package Aspen Plus TM was chosen as simulation tool, because of its extensive simulation and costing capabilities. Aspen Plus is a product of Aspen Technology, Inc. 251 Vassar Street, Cambridge, MA 02139.

The major source of uncertainty in the development of the computer model was the thermodynamic behavior of the ethanol-water-potassium acetate solutions.

Although this particular mixture has been the subject of two previous pilot plant studies, a reliable thermodynamic model for the vapor-liquid equilibrium behavior of the solutions was not available. A new activity coefficient model, the NRS model, which is able to represent the behavior of the solutions with good accuracy, has been developed. See Torres, J. L., "Computer Modeling and Evaluation of an Energy-Efficient Distillation Process", *D. Eng. Thesis*, Thayer School of Engineering, Dartmouth College, Hanover, NH (1988).

The NRS model is proposed as an extension of the UNIQUAC activity coefficient model, by the inclusion of a third contribution term, the salt contribution, to express the activity coefficient of solvent i as follows:

$$\gamma_i = \gamma_i^C \gamma_i^R \gamma_i^S \tag{1}$$

The combinatorial and residual contribution terms to the activity coefficient, $\gamma_i^C$ and $\gamma_i^R$, are calculated using the standard UNIQUAC binary parameters for ethanol and water. An important advantage of this approach is the availability of extensive tables of binary UNIQUAC parameters, which can be used by the NRS model without further regression.

The salt contribution term, $\gamma_i^S$, is calculated by an empirical expression based on a transformation of the three concentration variables in the solution. The molar concentration of solvent i is transformed to the salt-free mole fraction, as:

$$X_i = \frac{\text{mole fraction of solvent } i \text{ in the mixture}}{1 - \text{mole fraction of salt in the mixture}} \tag{2}$$

The salt molar concentration is transformed in terms of the maximum salt mole fraction that can be attained in the particular ethanol-water binary mixture at a pressue of one atmosphere, defining the normal relative saturation as:

$$\xi \frac{X_3}{X_3^*} = \frac{\text{mole fraction of salt in the mixture}}{\text{maximum salt mole fraction for the binary}} \tag{3}$$

Note that with the transformations described above, the composition of any liquid mixture of ethanol, water and a salt is uniquely determined by an $(X_1, \xi)$ pair. The range of possible values at atmospheric pressure is identical for both variables, $0.0 \leq X_1 \leq 1.0$ and $0.0 \leq \xi \leq 1.0$.

The development of the NRS model is discussed elsewhere. See Torres, J. L., "Computer Modeling and Evaluation of an Energy-Efficient Distillation Process", *D. Eng. Thesis*, Thayer School of Engineering, Dartmouth College, Hanover, NH (1988). The expression for the salt contribution term by the model is:

$$\ln \gamma_i^S = \xi [k_{oi} + k_{1i}\xi + k_{2i}X_i] \tag{4}$$

The regression of the parameters required by the NRS model can be facilitated by defining an auxiliary variable:

$$\Gamma = \ln \gamma_i^S / \xi \tag{5}$$

This auxiliary variable $\Gamma$ is a linear function of $X_i$ and $\xi$, and thus allows the use of simple least squares fitting for regression of $k_{oi}$, $k_{1i}$ and $k_{2i}$.

An important advantage of the NRS model is its ability to represent equilibrium curves at constant salt mole fraction, using parameters obtained from experimental data measured at the boundaries of the feasible region. These boundaries are: $\xi = 0$ (salt-free binary), $X_1$ or $X_2 = 0$ (signal solvent-salt solutions) and $\xi = 1.0$ (boiling liquid mixtures in equilibrium with a solid salt phase). The experimental measurements taken at these boundaries require relatively simple laboratory procedures.

The evaluation of the computer model for the vapor-liquid equilibrium behavior of the ethanol-water-salt mixtures required the regression of parameters from the experiment data reported by Schmitt, using a multi-variable linear regression program, and the calculation of a complete equilibrium curve, using a conventional bubble-point program. See Schmitt, D., "The Effect of Salt on the Vapor-Liquid Equilibrium of Binary Solutions and on the Distillation of Azeotropic Mixtures", *Dr. Ing. Thesis*, University of Karlsruhe, West Germany (1979).

In order to incorporate the NRS model into an Aspen simulation of the Alternative IHOSR Process, a constant potassium acetate concentration in the liquid phase was assumed for each section of the column. This assumption, confirmed in the actual distillation runs reported by Schmitt, allows the use of pseudo-binary distillation in the extractive column, where the presence of potassium acetate was not explicitly included. See Schmitt, D., "The Effect of Salt on the Vapor-Liquid Equilibrium of Binary Solutions and on the Distillation of Azeotropic Mixtures", *Dr. Ing. Thesis*, University of Karlsruhe, West Germany (1979); and Schmitt, D. and A. Vogelpohl, "Distillation of Ethanol-Water Solutions in the Presence of Potassium Acetate", *Separation Science and Technology* 18(6):547 Marcel Dekker (1983).

The vapor-liquid equilibrium behavior of this pseudo-binary for the entire range of salt-free compositions was calculated using the NRS model, in a separate bubble-point program. The equilibrium distribution variables ("K-values") for ethanol and water obtained from the program were then incorporated into Aspen in tabular form with temperature; the simulation program uses non-linear interpolation to calculate intermediate values. The enthalpies for the liquid streams were corrected to account for the presence of the salt.

Figure 10:
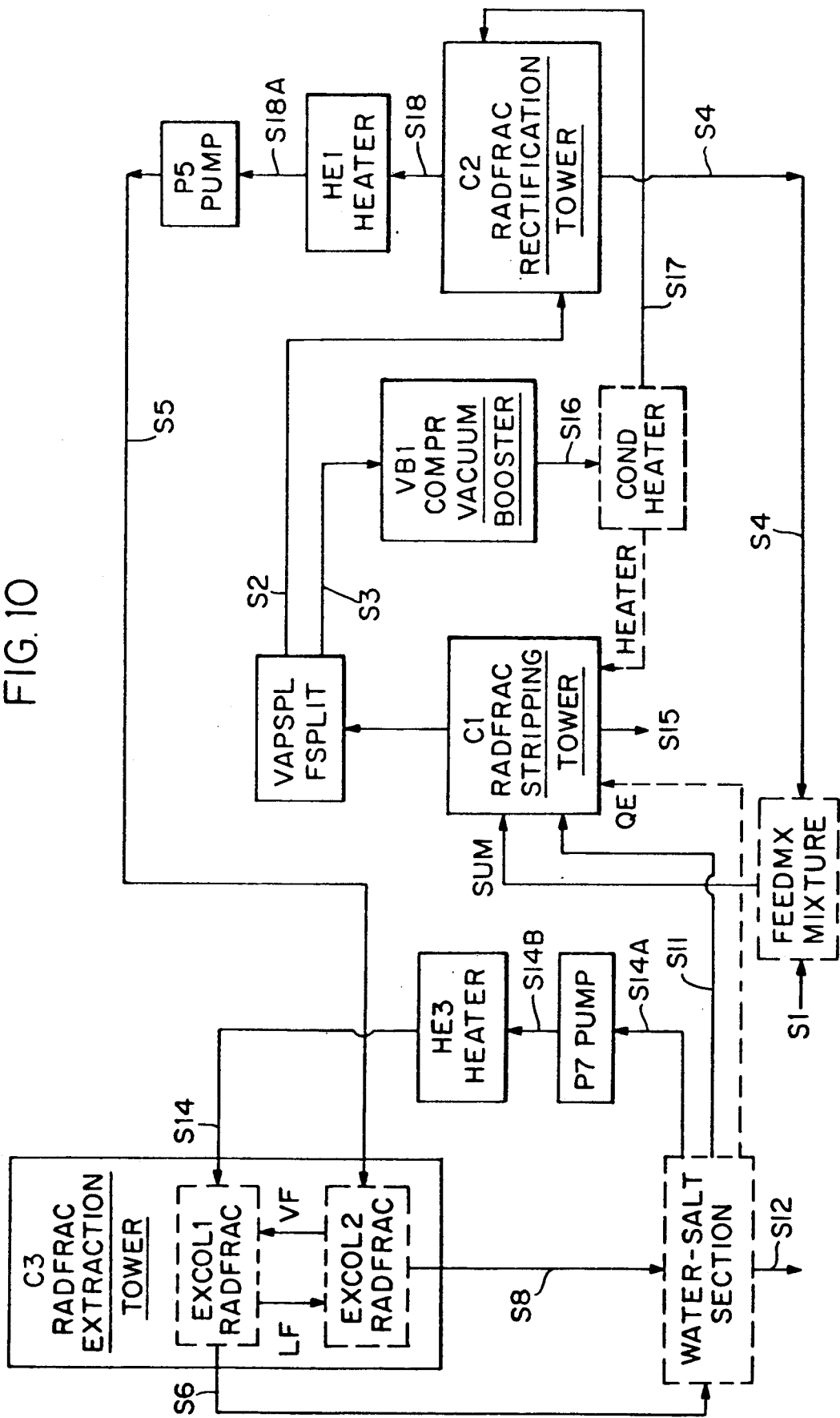
FIG. 10 is a conceptual block diagram of the Alternative IHOSR Process and the Aspen models used in a simulation.

The Alternative IHOSR Process was simulated in Aspen Plus ™, following the conceptual block diagram shown in FIG. 10. The various blocks presented include the corresponding Aspen unit operation models used. The pseudo-binary approach used in the case of the extractive column required two separate distillation column models. The "water-salt section" block, which includes the evaporator E1, the dryer D1 and other equipment, was calculated manually, due to the lack of suitable models in the simulation package.

ECONOMIC ANALYSIS PROCEDURE

It is possible to evaluate the economic advantages of the Alternative IHOSR Process and any other alternative processes for the separation of ethanol from dilute mixtures in water, by the use of a "cost-plus-return" approach, which incorporates the initial capital investment and the operating costs of each alternative into a single value. In this paper, the comparison is based on the Separation Cost Index, calculated by the following procedure:

a) The Aspen simulation runs report an "installed cost", or Direct Plant Investment (DPI). This corresponds to the equipment purchase costs (calculated for December 1987), plus the installation materials (calculated in Aspen with built-in multipliers) and installation labor costs (using a weighted average wage rate of $25/hour).

b) The Allocated Power, General and Services Facilities investment was calculated using the following factors:

For steam generation and handling, $30 per 1000 pounds of steam used per hour.

For electrical power usage, $200 per kW used.

For general facilities, 10% of the sum of Direct Plant Investment and Allocated Facilities. The allocated costs associated with process and cooling water usage or waste disposal were assumed to be relatively minor and also essentially constant for the various alternatives; therefore, they were not included in these calculations.

c) The Total Plant Investment (TPI) was then calculated as the sum of the direct plant investment and the allocated facilities investment. In order to incorporate both the initial and the operating costs in one single sum, the capital investment was included in the annual costs for each alternative process, by the addition of a statutory return on investment before taxes expressed as a percentage of TPI, as specified in each case.

b) The following operating costs were also calculated:

Energy costs, reported directly in the simulation results (steam at a fixed price per 1000 lbs, and electrical power, at $0.06 KWh; the effect of various steam prices was separately studied).

Direct operating labor, estimated as 0.35 manhours/ton of product. For a plant production of 25 MMgal/year, this translates to 26000 manhours, and using a wage rate of $20/manhour, results in a fixed operating cost of $520,000/year. Note that this cost will be the same for all alternatives, since it is a function only of total production rate.

To this direct operating labor were added: the cost for supervisory labor (18% of the direct operating labor), the cost for labor supplies and services (6% of d.o.l.), and the cost of plant overhead including administration (50% of d.o.l.) for a total of $436,800/year, again constant for all alternatives.

c) The following capital-related annual costs were also added:

Maintenance and repairs, estimated to be 3% of TPI.

Depreciation, estimated to be 8% of DPI, plus 6% of allocated costs.

Property taxes, estimated to be 2% of TPI.

Insurance, estimated to be 1% of TPI.

The sum of the above contributions was defined to be the Total Separation Cost (TSC). Finally, a Separation Cost Index was defined in terms of added cost per gallon of ethanol produced, by dividing the resulting Total Separation Cost ($/year) by the plant production (gal/year).

RESULTS AND DISCUSSION a) Thermodynamic Model

Figure 11:
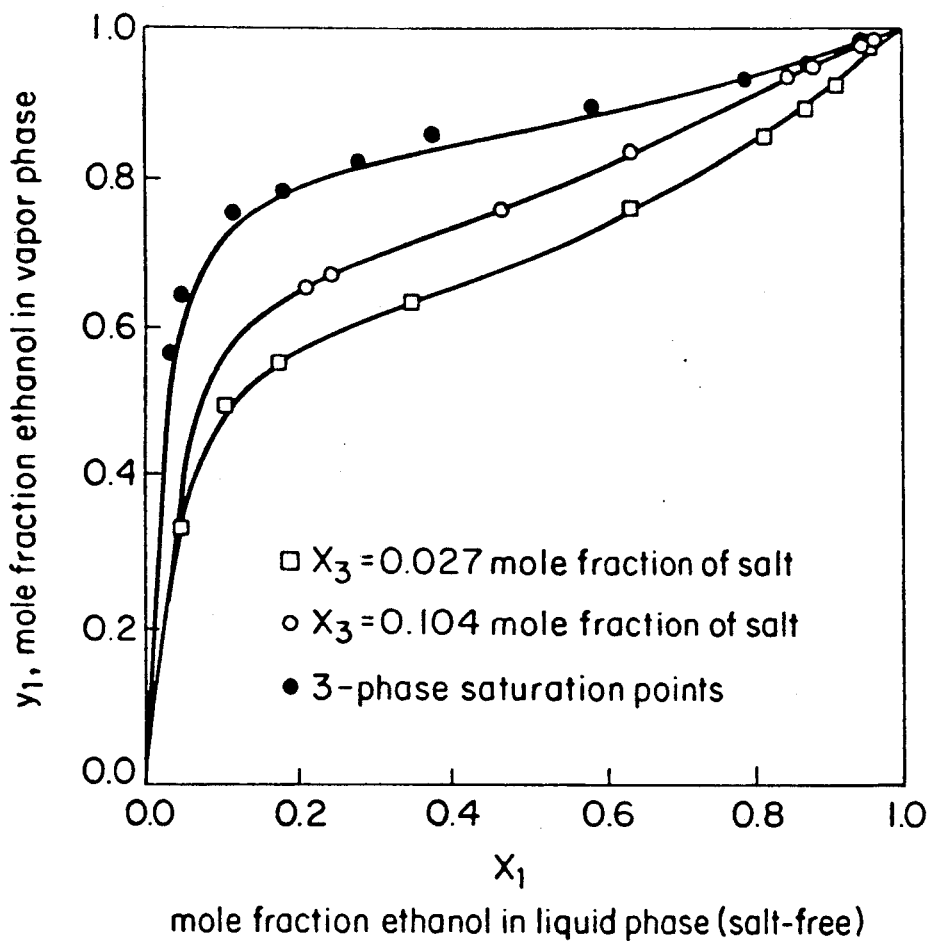
FIG. 11 is a graphical comparison of the predicted and experimental vapor compositions for the system ethanol-water-potassium acetate at atmospheric pressure.

The predictive accuracy of the NRS model for the ethanol-water-potassium acetate represents a significant improvement over previously available models. In comparison to the experimental data reported by Schmitt, obtained at about the maximum constant salt mole fraction achievable at atmospheric pressure, the NRS model produced average deviations in the vapor phase composition of 0.0074 mole fraction units, and in the bubble-point temperature of 1.48 K. The vapor composition is shown in FIG. 11, for two different salt concentrations and 3-phase saturation. The parameter values used in this comparison were obtained from boundary data, which did not include the experimental points shown in the two lower curves. b) Process simulation.

Figure 12:
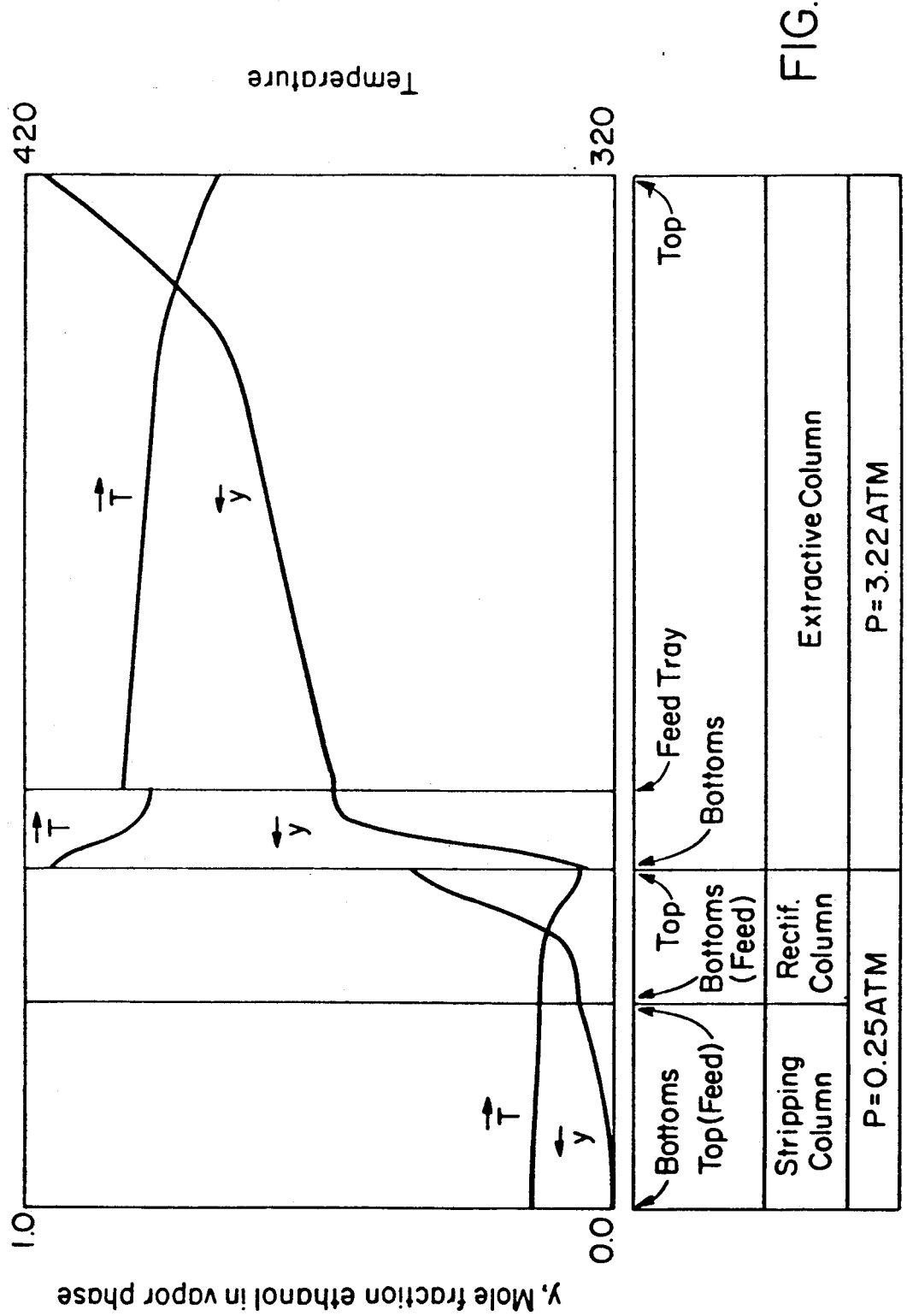
FIG. 12 is a plot of the profiles of ethanol concentration in the vapor phase and tempertaure, for the three distillation columns in the Alternative IHOSR Process.

FIG. 12 shows the temperature and vapor composition profiles calculated by the simulation for the three distillation columns in the process, for the 1.5% weight ethanol feed. The observed discontinuity in the temperature profile of the extractive column at the feed tray is the result of a change in the salt molar concentration in the liquid, caused by the introduction of the salt-free feed stream.

Figure 13:
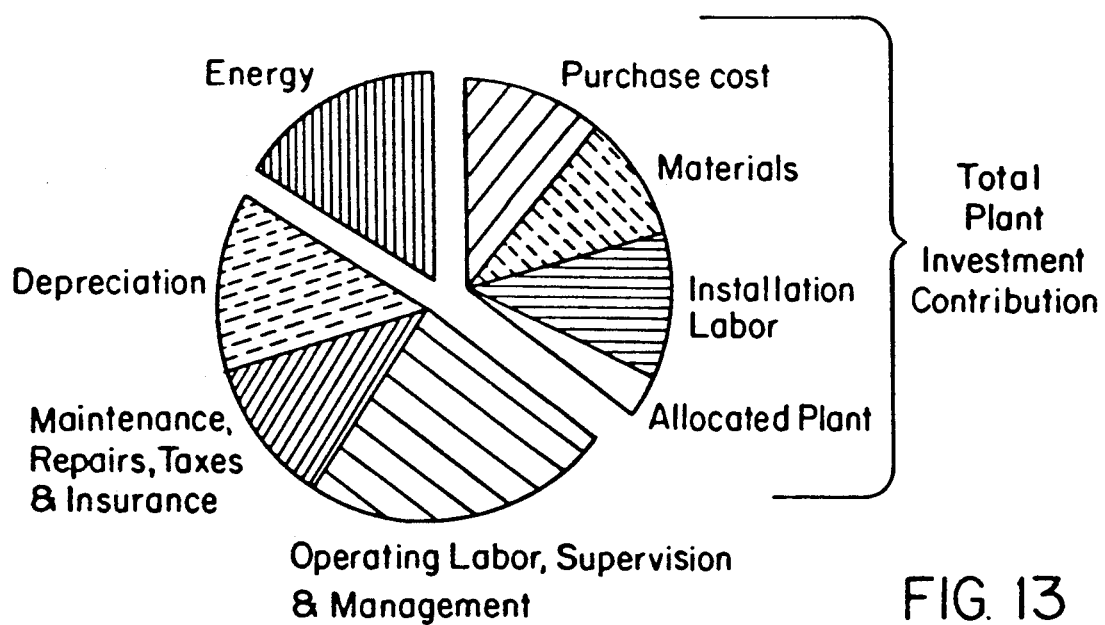
FIG. 13 is a graphical representation of the relative contribution of major cost components of the separation cost index for the Alternative IHOSR Process.

The Aspen-based computer simulation of the Alternative IHOSR Process also allowed the rapid calculation of capital and operating costs for several cases, which were then evaluated by the procedure outlined above. The design strategy of the Alternative IHOSR Process involved a trade-off between capital and energy costs to minimize energy usage, because the separation of ethanol from very dilute mixtures can be a highly energy-intensive operation. FIG. 13 shows the relative contributions of various costs to the Separation Cost Index of the Alternative IHOSR Process, for a feed concentration of 1.5% weight ethanol. The values shown were calculated using a statutory ROI of 20%, with steam priced at $5.00/1000 lbs. Total yearly production of ethanol was set at $25 \times 10^6$ gallons.

Figure 14:
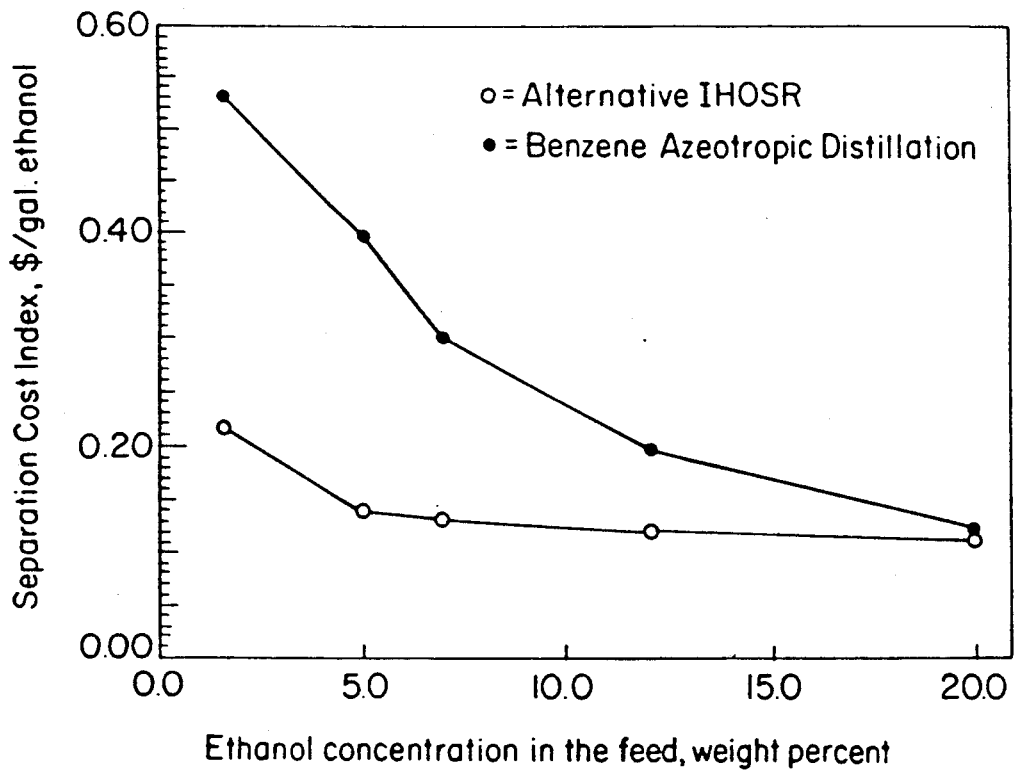
FIG. 14 is a graphical comparison of the separation cost index for the Alternative IHOSR Process in a conventional benzene azeotropic distillation process.

An economic comparison with a more conventional extractive distillation with benzene was also carried out. An annual ethanol production of 25 million gallons was chosen for the comparison, and an Aspen computer model was developed for the concentrating section of the conventional process; the equipment and operating costs of the azeotropic distillation section were reported by Chem Systems. See Chem Systems, Inc., "Economic Feasibility of an Enzymatic Hydrolysis Based Ethanol Plant with Prehydrolysis Pretreatment", SERI Subcontract No. XX-3-03097-2, New York, 1984. FIG. 14 shows the comparison for the case of a statutory ROI rate of 20% and an assumed steam cost of $5.00/1000 lbs of steam, for ethanol concentrations in the feed in the 1.5%-20% range. It can be observed that the Alternative IHOSR Process has a lower SCI for the entire concentration range shown; it also enjoys a significant economic advantage at the dilute end.

Figure 15:
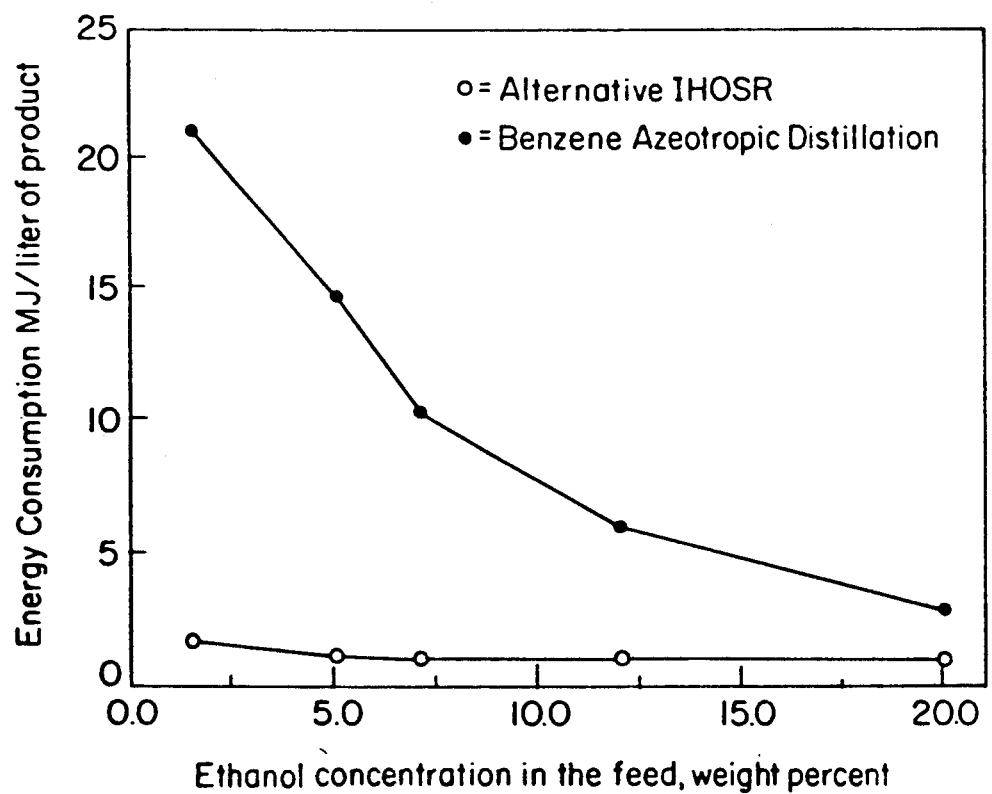
FIG. 15 is a graphical comparison of the energy consumption of the Alternative IHOSR Process in a conventional benzene azeotropic distillation.

FIG. 15 shows the energy requirements corresponding to the points plotted in FIG. 14. It may be seen that the total cost curve follows the general shape of the curve of energy requirements, which indicates that these costs (and not initial capital investment) may be the most important factor to be considered in economic comparisons between alterantive ethanol separation processes. This consideration is inhereent in the design strategy of the Alternative IHOSR Process.

Figure 16:
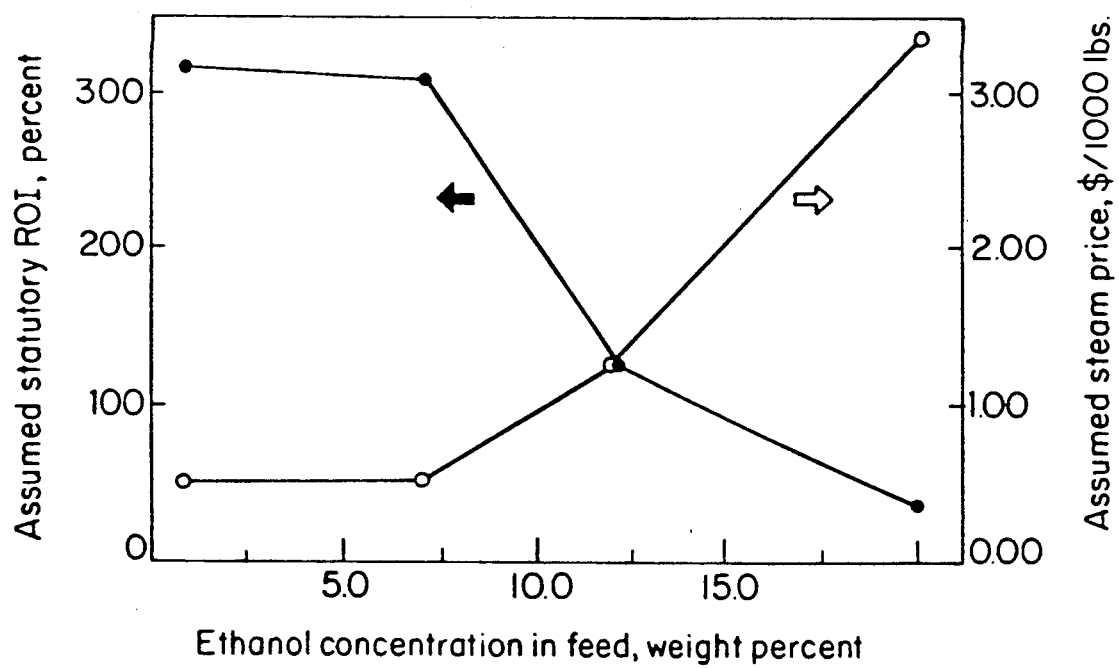
FIG. 16 is a plot of a parameter values required to match the separation cost indices of the Alternative IHOSR Process in a conventional benzene azeotropic distillation; as a function of ethanol concentration in the feed.

A substantial reduction in the energy requirements of the Alternative IHOSR Process is accomplished by a higher capital investment. Using reasonable values for the statutory ROI and mediumpressure steam price, the Alternative IHOSR Process offers substantial economic advantages. Conversely, it is possible to calculate the values of comprison parameters wthat would have to be used, in order to make the Alternative IHOSR Process and a conventional benzene azeotropic distillation equally attractive. FIG. 16 shows two of such comparisons: (a) the required statutory rate of return on investment, using a steam price of $5.00/1000 lbs, and (b) the required steam price, using a statutory ROI of 20%. The numerical value of these variables that match the SCI of both processes depend on the ethanol concentration in the feed; however, for the dilute concentrations typical of fermentation broths, very unrealistic values for ROI and/or steam prices are required for the conventional process to be equally attractive.

In summary, the economic comparisons undertaken lead us to believe that the Alternative IHOSR Process can potentially contribute to the economic feasibility of ethanol production from cellulosic substrates. Work is under way at the Thayer School, to extend these economic comparisons to include other alternative processes for the separation of ethanol and water.

Further modification of the invention herein disclosed will occur to persons skilled in the art and all such modifications are deemed to be within the scope of the invention as defined by the appended claims.

We claim:

1. A method for concentrating an aqueous ethanol solution, comprising, initially partially concentrating said aqueous ethanol solution in a heat-pumped distillation apparatus comprising one or more distillation columns in which a vapor stream is withdrawn from a point in said distillation apparatus having a temperature at the system pressure intermediate between the highest and lowest temperatures in said distillation apparatus for use as a heat source for transferring heat to a heat-sink liquid having a temperature at the system pressure higher than the temperature of said withdrawn vapor stream at the system pressure, the flow of the withdrawn vapor stream having an upper limit which causes the distillation apparatus to be pinched at a return point and a lower limit which provides significant changes in the internal reflux ratio at the point of return for the withdrawn vapor stream and thereafter performing work on vapor resulting from said withdrawn vapor stream to raise the condensation temperature of said vapor above the evaporation temperature of said heat-sink liquid and condensing at least a portion of said vapor resulting from the withdrawn vapor stream and returning the condensed liquid stream to the distillation apparatus at a point having a lower temperature than the temperature at its point of withdrawal and further concentrating the partially concentrated ethanol stream resulting from said initial concentration in an extractive distillation column in which a suitable salt is added to the extractive distillation column to eliminate an azeotrope between water and ethanol thereby increasing the relative volatility of ethanol and thereafter concentrating a salt-containing stream exiting from the extractive distillation column in an evaporator.

2. A method for separating an aqueous ethanol mixture to produce higher purity ethanol in a system including an extractive distillation column, an evaporator and a heat-pumped distillative apparatus comprising one or more distillation columns and wherein a suitable salt is added to the extractive distillation column to eliminate an azeotrope between water and ethanol thereby increasing the relative volatility of ethanol and wherein salt is thereafter concentrated by evaporation in the evaporator, a vapor stream being withdrawn from a point in said heat-pumped distillative apparatus having a temperature intermediate between the highest and lowest temperatures in said distillative apparatus for use as a heat source for transferring heat to a heat-sink liquid having a temperature at the heat-pumped distillative apparatus system pressure higher than the temperature of said withdrawn vapor stream at the system pressure, the flow rate of the withdrawn vapor stream having an upper limit which causes the heat-pumped distillative apparatus to be pinched at a return point and a lower limit which provides significant changes in the internal reflux ratio at the point of return of the withdrawn vapor stream and performing work on the withdrawn vapor to raise the condensation temperature of said vapor above the evaporation temperature of said heat-sink liquid and thereafter condensing at least a portion of said vapor and returning the resulting stream to the heat-pumped distillative apparatus at a point having a lower temperature than the temperature at its point of withdrawal.

3. A method for performing a distillative concentration of an aqueous ethanol solution in a system including a heat-pumped distillative apparatus, and extractive distillation column and an evaporator, comprising:
   a) partially concentrating said aqueous ethanol solution in the heat-pumped distillative apparatus having internal liquid and vapor streams, the flows of which define an internal reflux ratio to produce a liquid enriched in water and a vapor enriched in ethanol compared to the feed;
   b) withdrawing from a point in said distillation apparatus having a temperature intermediate between the highest and lowest temperatures in said apparatus a vapor stream for use as a heat source for transferring heat to a heat-sink liquid having a temperature at the system pressure higher than the temperature of said withdrawn vapor stream at the system pressure, the flow rate of the withdrawn vapor stream having an upper limit which causes the distillation apparatus to be pinched at a return point and a lower limit which provides significant changes in the internal reflux ratio at the point of return for the withdrawn vapor stream;
   c) performing work on vapor resulting from said withdrawn vapor stream to raise the condensation temperature of said vapor above the evaporation temperature of said heat-sink liquid;
   d) condensing at least a portion of said vapor resulting from the withdrawn vapor stream and employing heat from said condensation to vaporize at least a portion of the heat-sink liquid under conditions whereby the condensing vapor resulting from the withdrawn vapor stream acts as a heat-source of a heat pump and the vaporizing heat-liquid acts as a heat-sink of a heat pump to thereby transfer heat from said withdrawn vapor stream to said heat-sink liquid;
   e) removing and condensing partially enriched vapor from the heat-pumped distillative apparatus and introducing the resultant condensed stream to the extractive distillation column;
   f) concentrating said resultant condensed stream in the extractive distillation column in the presence of a salt added to the extractive distillation column to eliminate an azeotrope between water and ethanol to thereby produce a concentrated ethanol product;
   g) introducing into the evaporator a salt-containing but substantially ethanol-free bottoms liquid from said extractive distillation column;
   h) removing residual substantially ethanol-free liquid containing salt from the evaporator; and
   i) removing vapor from the evaporator.

4. A method of claim 3 wherein the residual substantially ethanol-free liquid from the evaporator is further concentrated in a dryer to produce effectively dry salt and said dry salt is reused in the extractive distillation column.

5. A method of claim 4 wherein the evaporator is at least partially heated by latent heat recovered by condensing ethanol-rich vapor exiting the extractive distillation column.

6. A method of claim 5 wherein steam resulting from the evaporator is added to said heat-pumped distillative apparatus to generate vapor for a stripping section of the heat pumped distillation apparatus.

7. A method of claim 6 wherein the heat-sink liquid is employed in heat exchange to generate vapor for a stripping section of the heat pumped distillation apparatus.

8. A method of claim 6 wherein a vapor side stream is substantially condensed and returned to the distillation column at a point where the internal liquid is in substantial equilibrium with the returned liquid.

9. A method of claim 6 wherein a side stream flow rate is maintained as close to the pinched condition as practical thereby maximizing the return of heat from the location of vapor withdrawn to a vapor-generating device for a distillation column.

10. A method of claim 6 wherein vapor employed as a heat source is withdrawn at a point of feed introduction.

* * * * *